US012718651B2

(12) United States Patent
McKay et al.

(10) Patent No.: US 12,718,651 B2
(45) Date of Patent: Aug. 25, 2026

(54) ELECTRONIC GAMING DEVICE WITH FIELD REPLACEABLE MODULAR DISPLAY PANEL

(71) Applicant: Aristocrat Technologies Australia Pty Limited, North Ryde (AU)

(72) Inventors: Linn McKay, Henderson, NV (US); Steven Wong, Las Vegas, NV (US); Dominic DeMarco, Round Rock, TX (US); Martin Mirakhour, Castle Hill (AU); Calvin Kim, Baulkham Hills (AU); David Thompson, Narrabeen (AU); Yi-Ching Leo Lin, Sydney (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 317 days.

(21) Appl. No.: 18/586,410

(22) Filed: Feb. 23, 2024

(65) Prior Publication Data

US 2024/0312296 A1 Sep. 19, 2024

Related U.S. Application Data

(60) Provisional application No. 63/452,682, filed on Mar. 16, 2023.

(51) Int. Cl.
*G07F 17/32* (2006.01)

(52) U.S. Cl.
CPC ...... *G07F 17/3216* (2013.01); *G07F 17/3202* (2013.01)

(58) Field of Classification Search
CPC .......................... G07F 17/3216; G07F 17/3202
See application file for complete search history.

(56) References Cited

U.S. PATENT DOCUMENTS

| | | | | |
|---|---|---|---|---|
| 7,452,280 B2 | 11/2008 | Kopera | | |
| 7,739,818 B2 | 6/2010 | Logan | | |
| 8,905,842 B2 | 12/2014 | Bainbridge | | |
| 8,920,239 B2 | 12/2014 | Reddy | | |
| 9,741,200 B2 | 8/2017 | Lesley | | |
| 2012/0220353 A1* | 8/2012 | Massing | ............. | G07F 17/3227 463/16 |
| 2022/0180695 A1* | 6/2022 | Fritz | ................... | G07F 17/3211 |
| 2022/0277611 A1* | 9/2022 | Winston | .............. | G07F 17/3213 |

* cited by examiner

*Primary Examiner* — Werner G Garner
(74) *Attorney, Agent, or Firm* — Weaver Austin Villeneuve & Sampson LLP

(57) ABSTRACT

An electronic gaming system that can accommodate one or more modularly replaceable topper displays. The gaming system includes a first housing proximate a second housing that has a link and a modular mounting component. The first housing includes a first display device. The second housing is configured to receive different variants of a second topper display that has common mounting components to mount on the modular mounting component. When coupled to the link, power and data are transmitted to the topper displays connected.

20 Claims, 23 Drawing Sheets

ELECTRONIC GAMING DEVICE WITH FIELD REPLACEABLE MODULAR DISPLAY PANEL

RELATED APPLICATION

The present application is a continuation of and claims priority to U.S. Patent Application No. 63/452,682, filed Mar. 16, 2023, and entitled "Electronic Gaming Device with Field Replaceable Modular Display Panel" which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

Gaming machines or devices typically may employ one or more display modules, panels, cabinets, or terminals, such as, for example, top boxes, player tracking devices, and the like, for wagering games, non-wagering games, community games, social games, gaming information sharing, player tracking, pay table displays, and attractions. These display modules may include one or more liquid crystal displays (LCD) to perform such functions. With relative high costs of LCD displays, gaming manufacturers are challenged to develop new, cost-efficient, or cost-effective ways to optimize, improve, and maintain electronic gaming devices with display modules, and to provide these display modules with versatility, better footprints, appearances, flexibilities and modularity between different platforms.

For example, when an electronic gaming machine that is installed or fixed on a casino floor, i.e., in the field, changes its game offering from a first game to a new game, a gaming manufacturer may have to entirely remove the gaming machine from the floor to remove any display and/or artwork related to the first game on a top box, replace the display and/or artwork for the new game, and return and re-install the gaming machine on the floor while complying with any security protocols for secure gaming. The removal, replacement, and re-installation of a gaming machine involves processes that may be time consuming and be inflexible in varying game machine display capabilities, and, in turn, cause a casino operator to incur cost from undergoing the processes and from the loss of game operation on the casino floor. Manual artwork replacement on the top box can also present bottlenecks on removal, replacement and re-installation with the repetitive changing gaming industry when game machines need to be removed from the casino floor. As such, a modular gaming display for gaming machines that offers greater flexibility in display configurations and less time consuming removal, replacement and re-installation of the display modules and/or artwork when a gaming display module is to be replaced will be welcome innovation for casinos employing such gaming technology and the like.

SUMMARY

In an implementation, an electronic gaming system or gaming device comprises a topper display device that permits different modular variants of the topper display device that are field changeable and adjustable. One or more mounting components connect the topper display to the gaming device. The gaming device may also include one or more links that function as supports of the topper display device or electronic controls for the topper display device.

In one modular variant, the topper display device includes a static artwork and an illumination device that backlights the static artwork. The static artwork may be removable, for example, by sliding the artwork in and out of the topper display device to make any field operation less time consuming. Such exemplary scenarios provide game manufacturers and designers and casino operators with added flexibility in the artwork that may be displayed and cost-effectiveness in replacing one set of art work with another, for example.

To install the static artwork, the base or pedestal gaming device may be accessed or opened to locate one or more secure mounting components. The secure mounting components are first released or disconnected from the gaming device. When the topper display device is separated from the base gaming device, one or more panels of the topper display device covering any original static artwork are detached or opened to expose the artwork position in one or more slots in the topper display device. The original static artwork is removed from the one or more slots, and then replaced with a new static artwork. The new static artwork is inserted into the one or more slots, and the one or more panels of the topper display device are attached or closed to securely cover the artwork. The artwork may be positioned in relation to the illumination device of the topper display device.

In another modular variant, the topper display device comprises a different display device, e.g., an LCD topper display device or panel, that may be the same or similarly sized and shaped to the modular variant with static artwork that is to be removed. Of course, the size and shape of the different or new display device may be different from the existing display device that is to be replaced.

To install the different modular variant display, the mounting components for the other modular variant being replaced are released or disconnected from the base gaming device, similar to one modular variant describe above. When the topper display device is separated from the base gaming device, panels are detached or removed from the topper display device. The existing display device is replaced with the different display device. Commonly configured mounting components are arranged to join to the different display device, and then securely join the different display device to the gaming cabinet.

These and other variations, advantages, aspects and novel features of the present disclosure, as well as details of illustrated implementations thereof, will be more fully understood from the following description and drawings.

DETAILED DESCRIPTION

Figure 1:
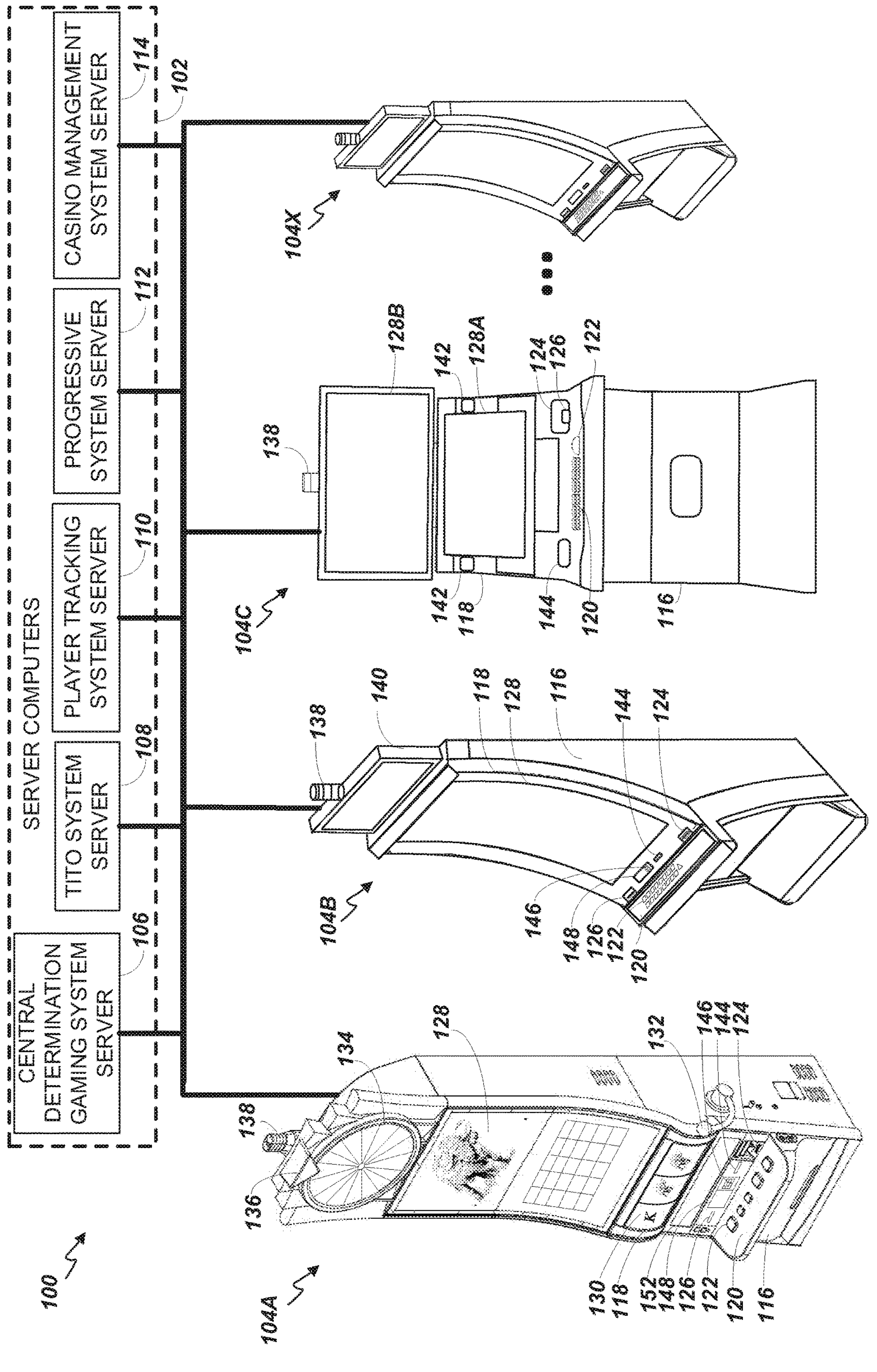
FIG. 1 is an exemplary diagram showing several EGMs networked with various gaming related servers.

Systems, devices, and methods for an electronic gaming machine with a modular display module disclosed that comprises a modular housing with replaceable display variants and common assemblies and supports. The replaceable display variants include substitutable static artwork that may be backlit by an illumination unit, may be programmable LCD displays or various combinations of the same.

Implementations of the present disclosure represent a technical improvement in the art of gaming technology. Specifically, the implementations illustrated address the technical problem of on-site or field replacement of topper displays on a gaming device, where artwork and/or display configurations having been inflexible to change and costly to replace on a relatively frequent basis.

Implementations of the present disclosure employ a gaming device that includes a topper display device to permit replacement between different modular variants of the topper display device. One or more common mounting components connect the topper display to the gaming device. The gaming device may also include one or more links that function as supports of the topper display device and/or may also provide electronic controls for the topper display device.

In one modular variant, the topper display device includes a static artwork and an illumination device that backlights the static artwork. Additionally, such housing and devices can integrate other displays or artwork to further rapid and cost-effective change of the topper displays in the field. The housing and topper display devices are adaptable to a wide range of gaming environments from single player devices to communal gaming environments.

In one example, the disclosure provides a modular gaming system that includes a cabinet comprising a link housed by the cabinet and a first mounting component, a first display device pivotedly mounted on the cabinet, and a second display device. The second display device has a housing assembly and a second mounting component. The housing assembly and the second mounting component releasably supports different variants of the second display device. The housing assembly, the first mounting component, and the second mounting component are common among different variants of the second display device, respectively. The second mounting component is releasably coupled to the first mounting component, and is operable with power and data transmitted through the link. The first display device supports the second display device when the second display device is detached from the first mounting component.

In another example, the disclosure provides a gaming machine that includes a first display device pivotedly mounted on a first housing, and a second housing adjacent the first housing, the second housing having a modular mounting component. The gaming machine also includes a second display device having a second mounting component, the second housing and the second mounting component operable to releasably support different variants of the second display device, the second housing, the modular mounting component, and the second mounting component being common among different variants of the second display device, and being releasably mounted on the modular mounting component, and receiving power and data transmitted through the modular mounting component. The first display device supports the second display device when the second display device is detached from the modular mounting component.

In still another example, the disclosure provides a method of configuring a gaming machine that includes a first display device pivotedly mounted on a first housing, a second housing having a modular mounting component, and a second display device having a second mounting component, the second mounting component being operable to releasably support different variants of the second display device, the second housing, the modular mounting component, and the second mounting component being common among different variants of the second display device. The method includes mounting the second housing adjacent the first housing, releasably mounting the second mounting component of the second display device on the modular mounting component, and receiving power and data at the second display device transmitted through the modular mounting component. The first display device supports the second display device when the second display device is detached from the modular mounting component.

The above examples are not intended to be limiting, but merely exemplary of technologic improvements provided by some implementations of the present disclosure. Technological improvements of other implementations are readily apparent to those of ordinary skill in the art in light of the present disclosure.

FIG. 1 illustrates several different models of EGMs which may be networked to various gaming related servers. Shown is an electronic gaming system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a “ticket-in” reader that allows the player to use a casino issued credit ticket to load credits onto the gaming device 104A (e.g., in a cashless ticket (“TITO”) system). In such cashless implementations, the gaming device 104A may also include a “ticket-out” printer 126 for outputting a credit ticket when a “cash out” button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
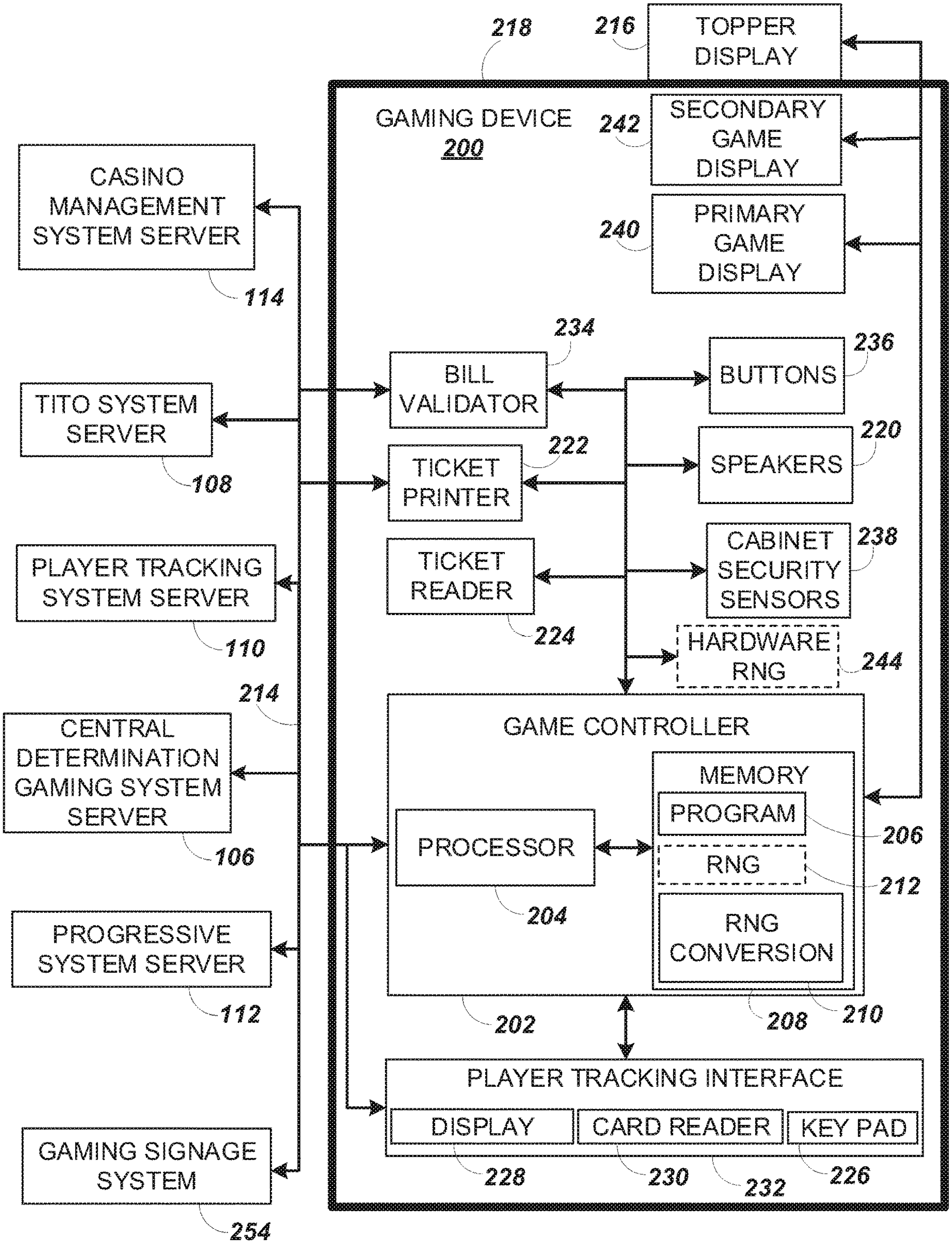
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104X and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
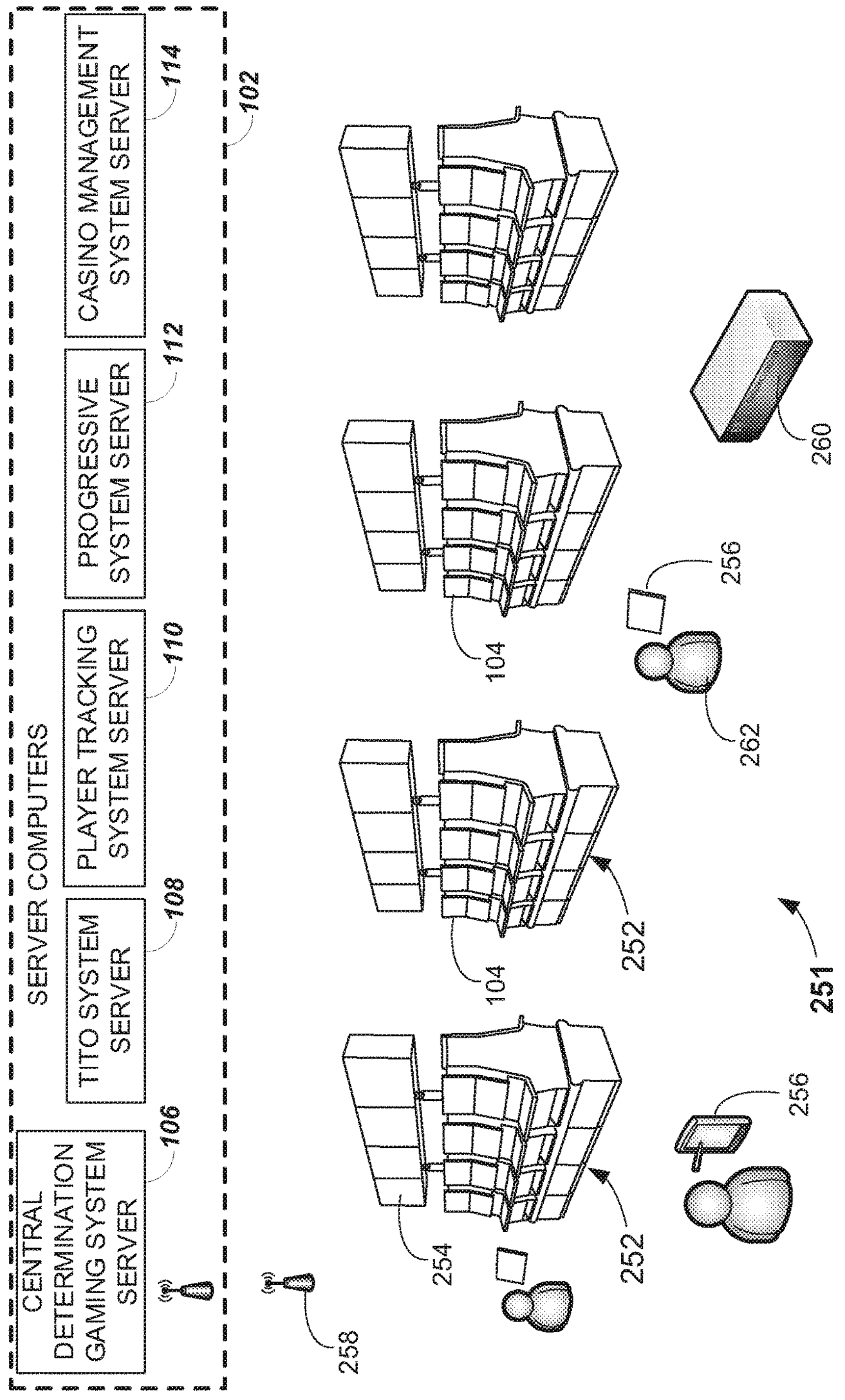
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
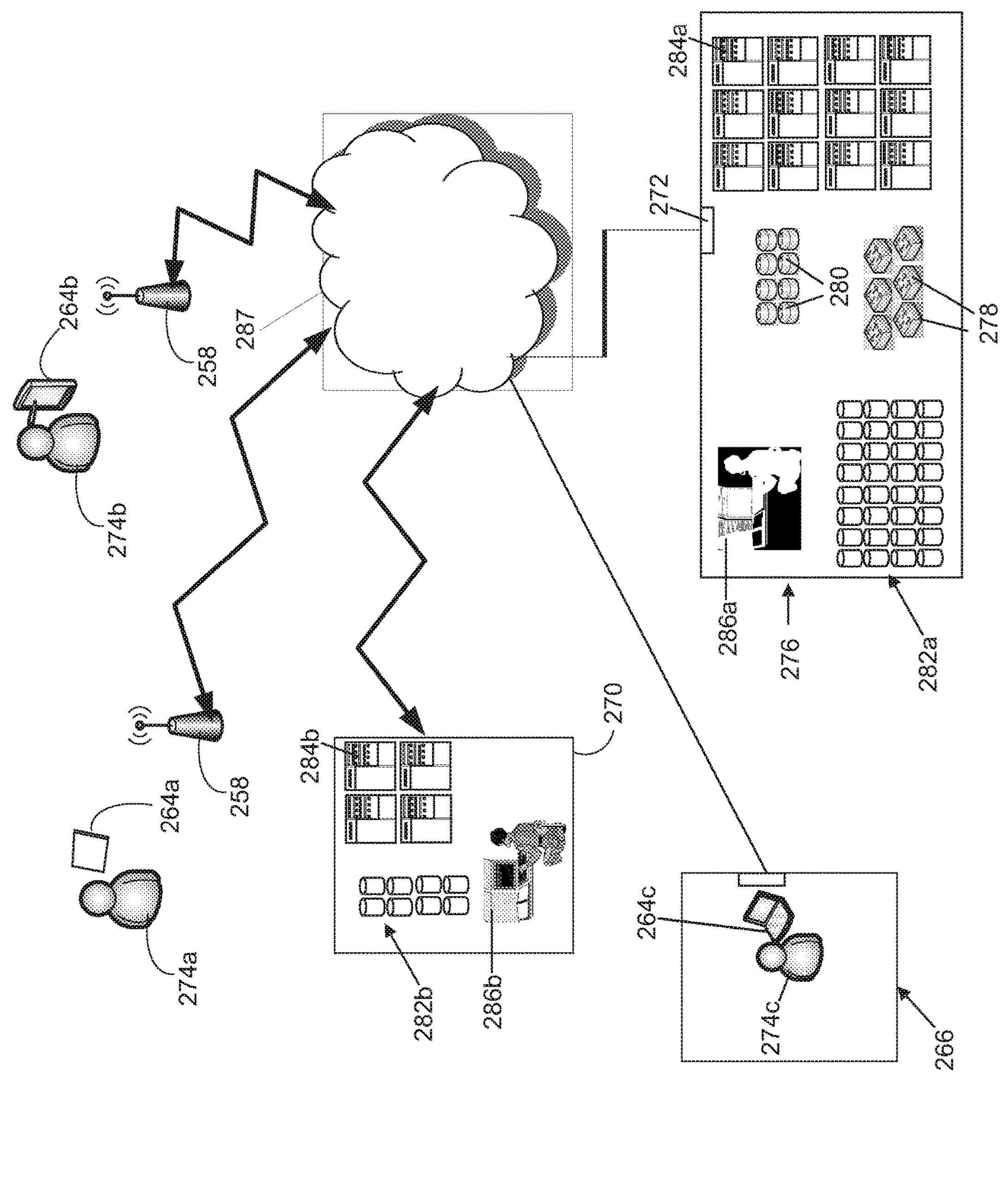
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 287. The networks 287 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 287. The gaming data center 276 is capable of communication with the networks 287 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 287. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 287. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*, 274*b* and 274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
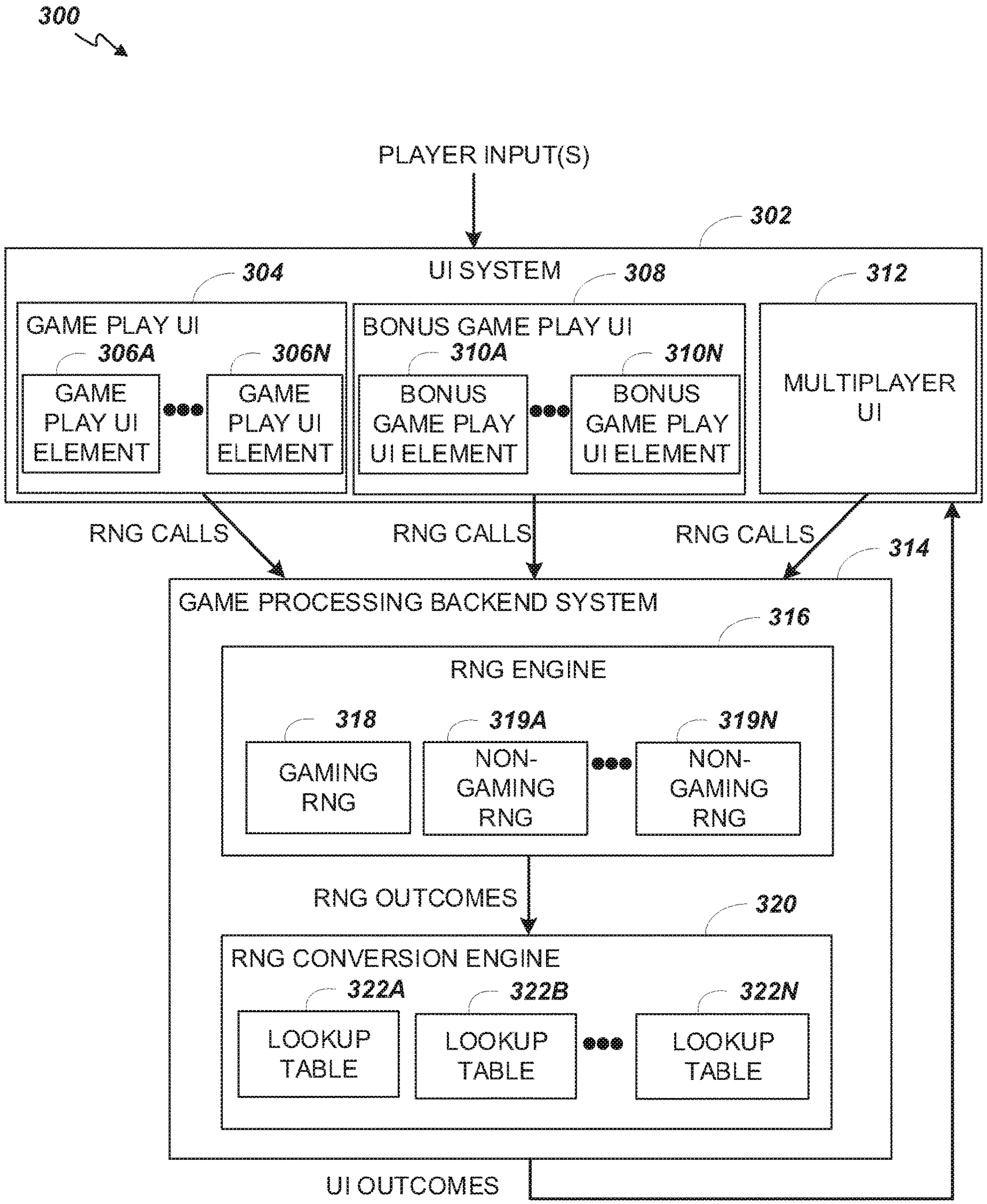
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element

306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could correspond to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4A:
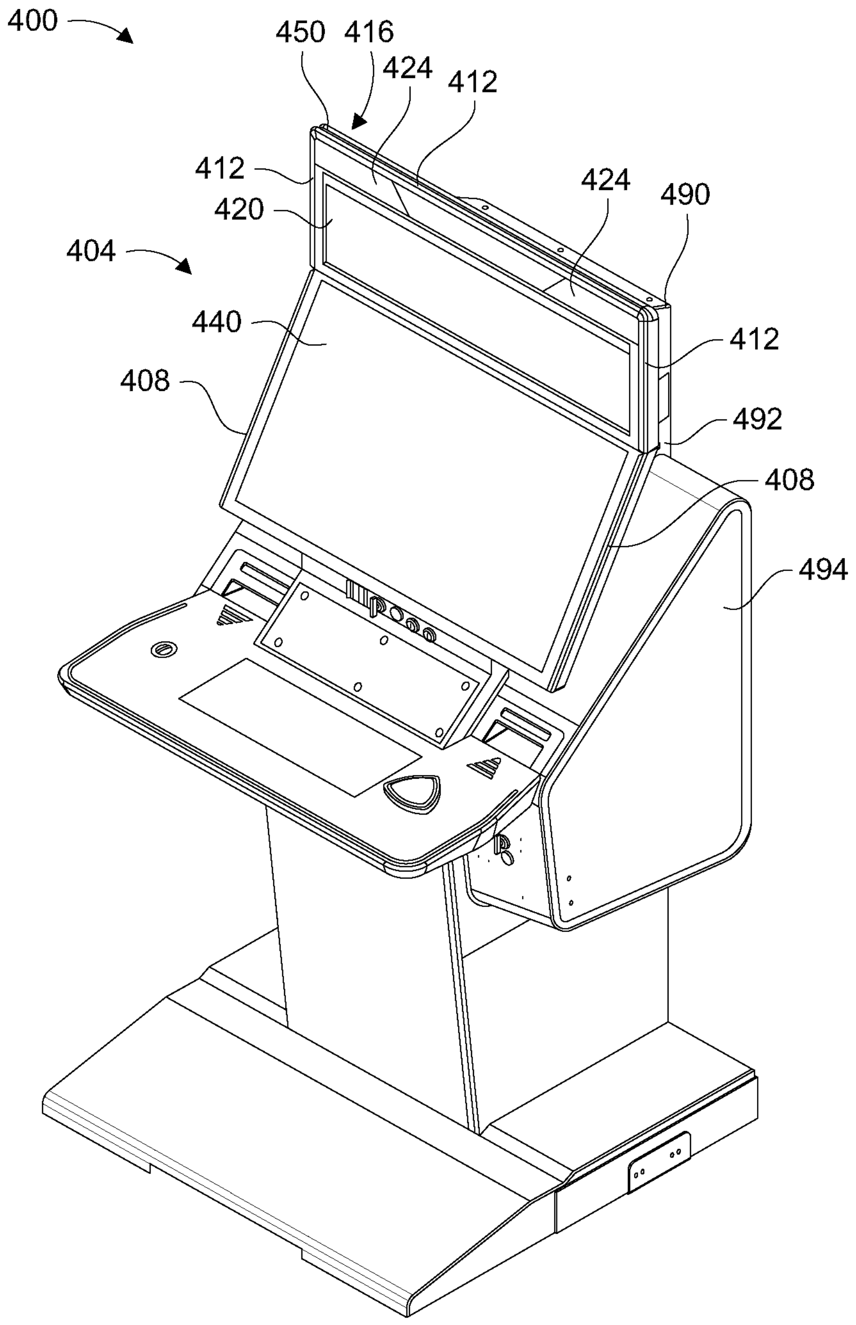
FIG. 4A illustrates a perspective view of a gaming device.
Figure 4B:
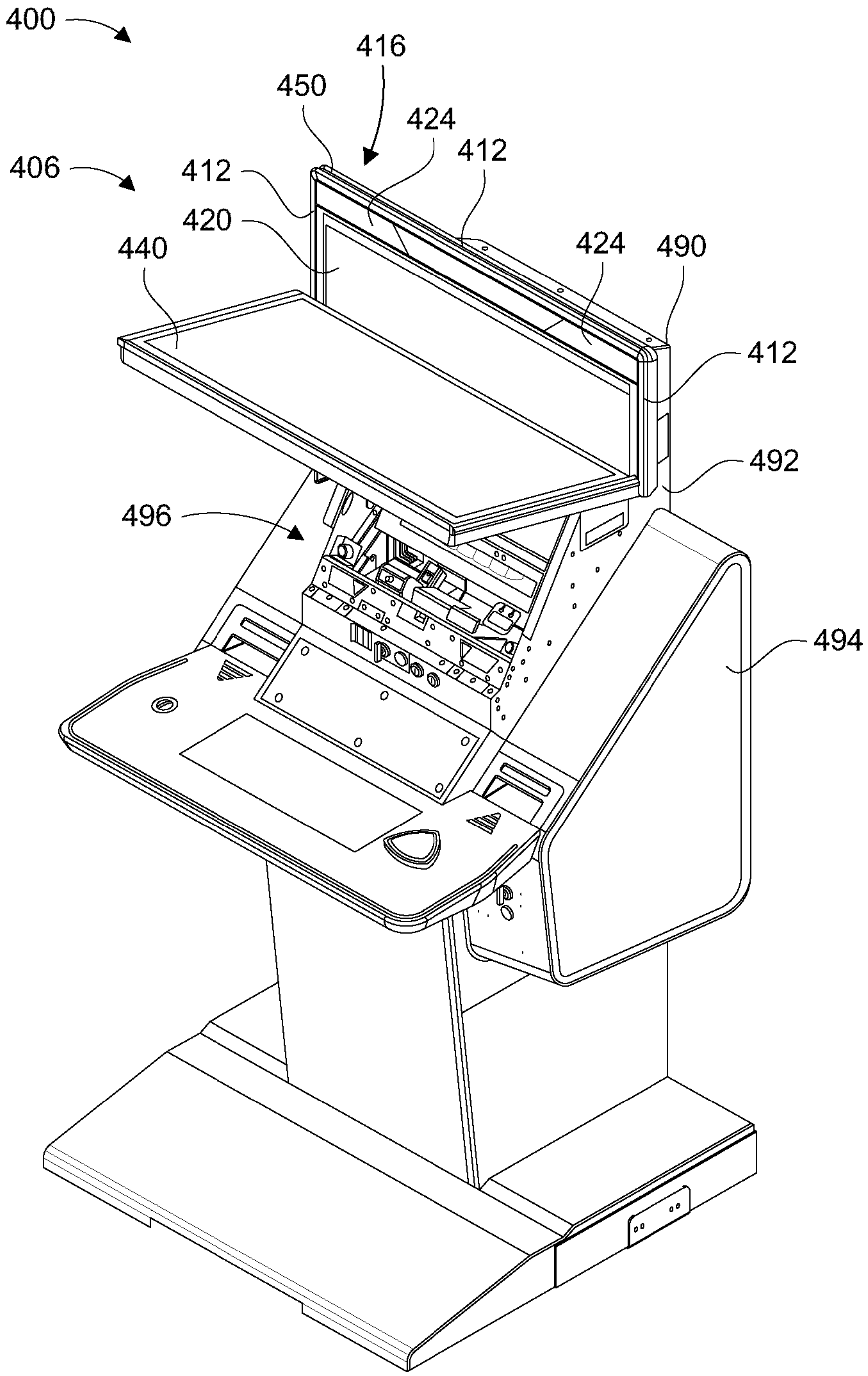
FIG. 4B illustrates a perspective view of the gaming device of FIG. 4A with a main display opened.

FIGS. 4A and 4B depict a gaming device 400 with a main display 440 (e.g., display 128A in FIG. 1) and a topper or a top display 416 (e.g., topper display 216 in FIG. 2A), in a closed state 404 and an opened state 406. In some embodiments, the gaming device 400 may be similar to any of the gaming devices 104A-104X. In some embodiments, the gaming device 400 may be a MarsX® series of gaming consoles. The main display 440 may comprise a main video display (MVD) having a 27" 4K touchscreen display monitor. Although the main display 440, as shown in FIGS. 4A and 4B, may include one main display monitor, other main displays may include a number of display monitors, e.g., secondary game display. Additionally, the main display 440 may comprise a curved display arrangement.

As discussed above, FIG. 4A shows that the gaming device 400 is in the closed state 404. While in the closed state 404, the top display 416 and the main display 440 may form a unified display in some embodiments. However, interior of the gaming device 400 is inaccessible in the closed state 404. Further, the gaming device 400 is generally considered as being game or player ready in the closed state 404. FIG. 4A also shows that the top display 416 includes a visual component 420 and a housing assembly 450 that is modularly mounted to top box 490, detailed below. The top box 490 may be releasably connected to or mounted on a platform, or pedestal 492. The platform or pedestal 492 may be separate from or integral to a cabinet 494.

While the main display 440 is typically employed to display different games, the top display 416 often defines one or more themes of the games that are offered by the gaming device 400. The one or more themes may be presented visually to a user by the top display 416 with the visual component 420 in the form of a fixed artwork or LCD displays, as detailed below. The visual component 420 is housed in a modular housing assembly, or housing assembly 450. The housing assembly 450 may include mounting components that permit different modular variants of housing assemblies to be mounted on the top box 490.

As shown, the gaming device 400 also includes a first lighting string 408 that wraps about a portion of the top display 416 and a second lighting string 412 that wraps around a portion of the main display 440. In some embodiments, the first lighting string 408 includes a first interface (not shown) that connects to a second interface (not shown) in the second lighting string 412. The first interface and the second interface may be in the form of USB connectors, magnetic power connectors, and the like. When connected, the first lighting string 408 and the second lighting string 412 form a unity lighting device and may create an appearance of a unified screen with the main display 440 and the top display 416, and, similarly, a single border around the main display 440 and the top display 416 for attraction and for easy alignment for servicing. In some embodiments, at least one of the unified screen and the unity lighting device may be lit or activated to synchronize with audio signals such music and sounds, or visual signals such as images and videos generated. In this regard, the top display 416 also includes an audio component 424 in the form of one or more sound bars or speakers to broadcast the audio signals. As shown, the audio component 424 is positioned above the visual component 420. In other embodiments, the audio component 424 may also be positioned on either sides or bottom of the visual component 420 in the housing assembly 450, such that when the housing assembly 450 is detached from the top box 490, the audio component 424 may also be removed, adjusted, repaired, or replaced.

In yet other embodiments, the visual component 420 may also display generic artwork for use with different games. In some embodiments, the visual component 420 may also comprise a 27" 4K touchscreen display monitor. In other embodiments, the visual component 420 may include game-theme related static artworks. In still other embodiments, the visual component 420 may also include a predetermined-dimensioned LCD display. The visual component 420, when in the form of an LCD display, may take one of several sizes and shapes and may have varied screen resolutions. The visual component 420 may be configured to provide a relatively contiguous screen arrangement between the top display 416 and the main display 440. The visual component 420 may be controlled by the controller 202, and may be configured to operate with one or more other electronic gaming machines 104A-104X and/or server computers 102. In yet other embodiments, the visual component 420 may include the bonus topper wheel 134 on gaming device 104A as shown in FIG. 1. In some such embodiments, the top display 416 containing generic artwork may be modularly and easily replaced with a 27" 4K touchscreen display monitor, various sized LCD displays, a bonus topper wheel, or the like. As such, it is understood that any of the 27" 4K touchscreen display monitor, various sized LCD displays, bonus topper wheel, or the like, may be used in the top display 416 when the top display 416 is discussed for clarity purposes.

To move the main display 440 from the closed state 404 to the opened state 406, the main display 440 is pivotedly mounted on the cabinet 494. While in the opened state 406, the gaming device 400 is generally considered as not being game or player ready. FIG. 4B also shows that the main display 440 has been opened and tilted or moved upward in the opened state 406 to allow access to interior 496 of the cabinet 494. The gaming device 400 is then maintenance ready in the opened state 406. As such, in the opened state 406, the main display 440 may pivot to an open position as shown in FIG. 4B. When the main display 440 is in the open position as shown in FIG. 4B, mounting, securing, supporting, locking structures or mechanisms that secure or mount the housing assembly 450 to the top box 490 are exposed. Other locations for the locking structures are contemplated. For example, such locations may be located anywhere where they provide adequate security from tampering.

The interior 496 may comprise: locks, logic components, communication systems, audio/visual systems, power supply, hinges that allow the main display 440 to swing open or pivotedly move in this example, and fasteners or latches that secure the top display 416 to the pedestal 492 or the cabinet 494. Specifically, separate lock structures or locking means (e.g., combination locks, biometric scanners, retinal scanners, etc.) may be provided such that only authorized personnel are allowed to have secured access to the interior 496 of the cabinet 494 and the top display 416.

Figure 4C:
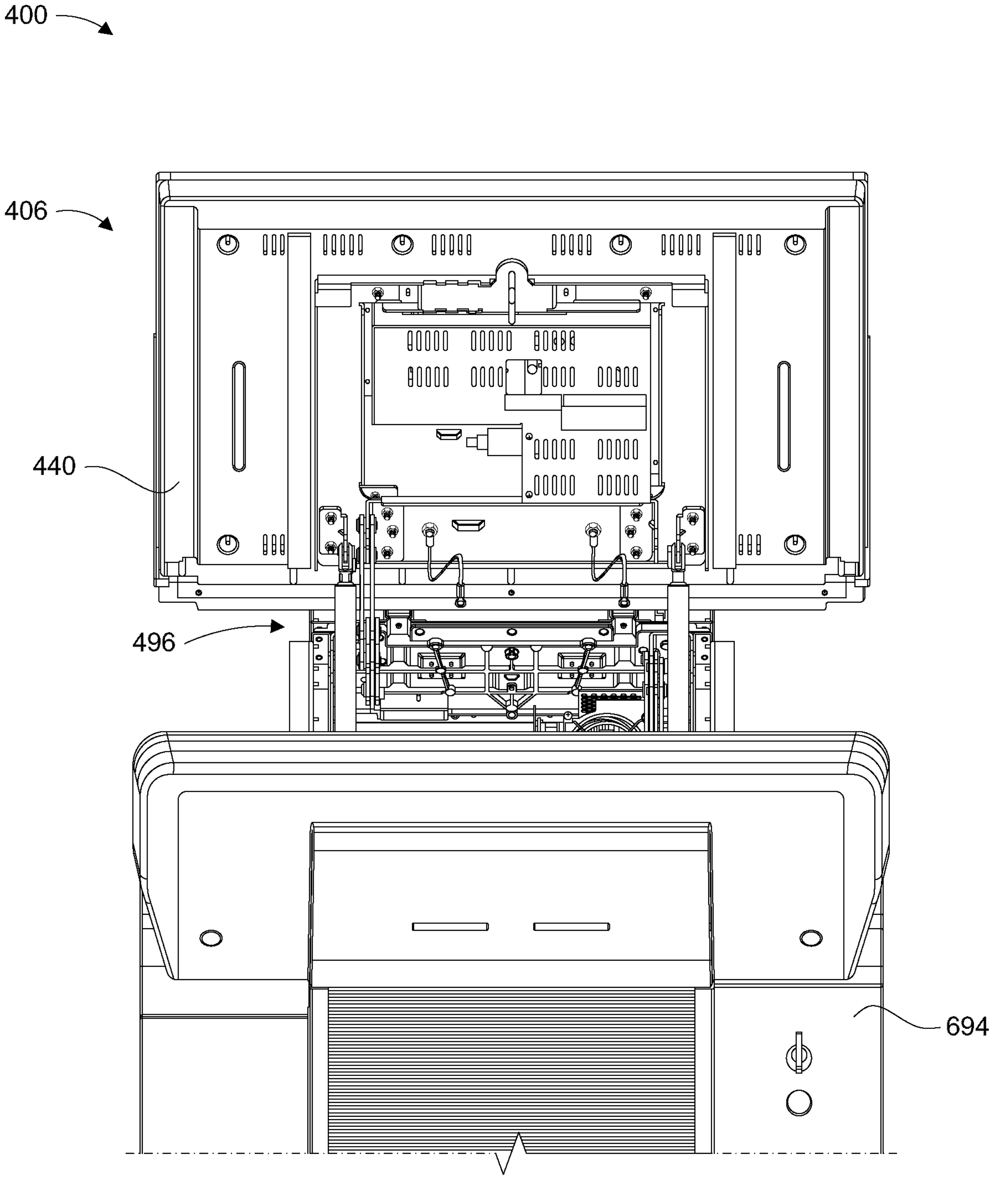
FIG. 4C illustrates an interior view of the gaming device of FIG. 4B.
Figure 4D:
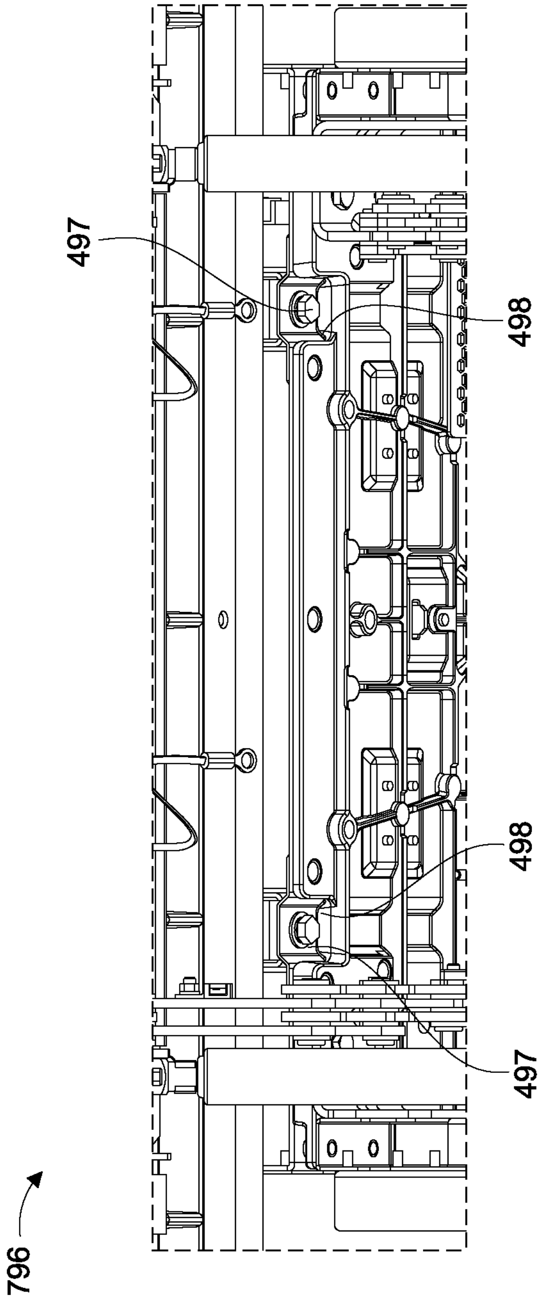
FIG. 4D illustrates locations of mounting screws of FIG. 4C.

FIG. 4C illustrates a bottom-up interior view of the gaming device 400 of FIG. 4B, when the main display 440 is swung opened to the opened state 406 exposing interior 496 for access into the gaming device 400, while FIG. 4D illustrates locations of mounting screws in a portion of interior 496 that is accessible from the outside and can be visually inspected from the outside.

Specifically, FIG. 4D shows first fasteners 497 comprising machine screws securing or mounting the top display 416 to the top box 490 as shown at modular mounting components comprising brackets 498. Other types of modular mounting components may comprise: bolts, adhesives, anchors, quick access fasteners, quick release pins, quarter-turn fasteners, magnets, and the like to secure the top display 416. In the embodiment, the first fasteners 497 may be accessed only when the main display 440 is opened. Other types of mounting components may comprise: L-brackets, J-brackets, box brackets, U-brackets, Z-brackets, gusset brackets, pole brace brackets, rail brackets, and the like.

Figure 5A:
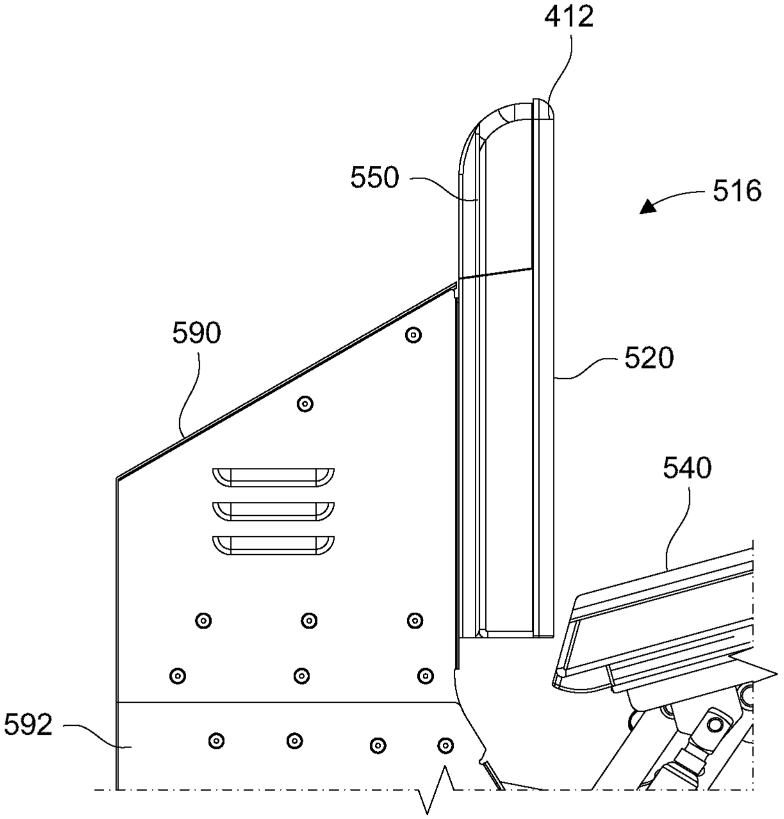
FIG. 5A illustrates a side view of a top display on the gaming device of FIG. 4A.
Figure 5B:
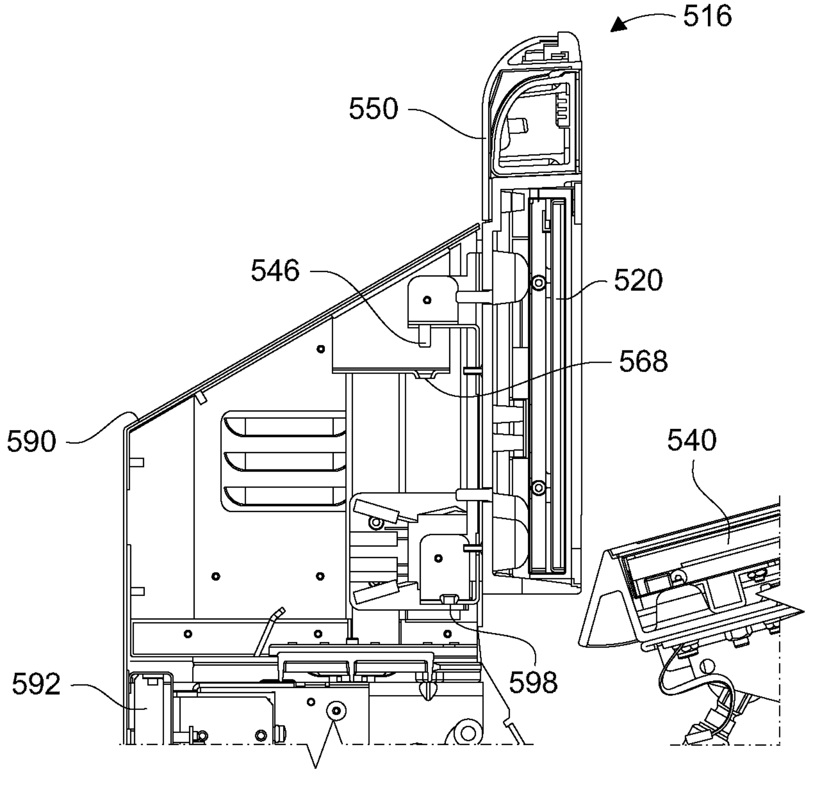
FIG. 5B illustrates a sectional view of the top display in FIG. 5A.

FIG. 5A illustrates a side view of top display 516 (similar to top display 416 on gaming device 400 of FIG. 4A) having a housing assembly 550 (similar to the housing assembly 450 of FIG. 4A) that is mounted on a top box 590 (similar to top box 450 of FIG. 4A). FIG. 5B illustrates a sectional view of the top display 516 of FIG. 5A. FIG. 5B also shows that the top display 516 comprises a visual component 520 (similar to the visual component 420) housed in the housing assembly 550 mounted on the top box 590.

Specifically, FIG. 5B illustrates the first fasteners 497 (shown in FIG. 4D) that secure the top display 516 to the top box 550 having been removed from brackets 598 (similar to the brackets 498 of FIG. 4D). FIG. 5B also shows a second fastener 546 that secures the housing assembly 550 to the top box 590 having been removed, detached, or pulled away from pin hole 568, thereby releasing the housing assembly 550 from the top box 590. When the second fastener 546 clears the pin hole 568, the housing assembly 550 can be pulled upward and subsequently detached from the top box 590. When the housing assembly 550 has been separated from the top box 590, the top display 516 can be adjusted or replaced.

As discussed above, top display 516 containing generic artwork may be modularly and easily replaced with a 27" 4K touchscreen display monitor, various sized LCD displays, a bonus topper wheel, or the like. As such, it is understood that any combination of 4K touchscreen display monitors, various sized LCD displays, bonus topper wheels, or the like, may be used as the top display 516 when the top display 516 is discussed for clarity purposes. For example, the top display 516 may be in the form of a number of 4K touchscreen display monitors stacked or arranged side by side. For another example, the top display 516 may be in the form of a number of stacked bonus topper wheels. In such embodiments, the top box 590 or the housing assembly 550 may be reconfigured or resized to accommodate multiple top displays. For still another example, the top display 516 may include a single 4K touchscreen display monitor.

Figure 6:
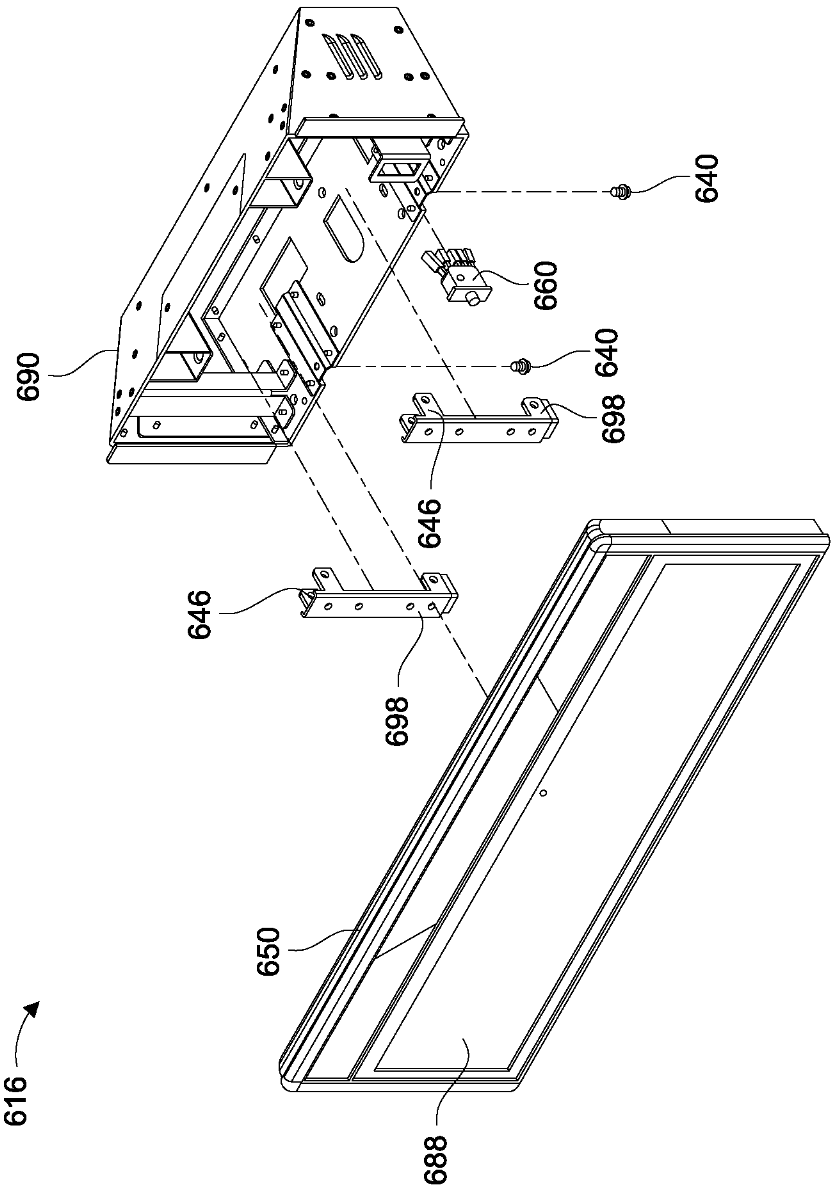
FIG. 6 illustrates an exploded view of the top display in FIG. 5A.

FIG. 6 illustrates an exploded view of a housing assembly 650 (similar to housing assembly 450 of FIG. 4A), illustrating a number of common modular mounting components that support modularity or different variants of top display

616. Specifically, FIG. 6 shows that a top box 690 (similar to the top box 490 of FIG. 4A), a housing assembly 650 (similar to housing assembly 450 of FIG. 4A), and mounting components 698 (similar to brackets 498 of FIG. 4B). The mounting components 698 may generally include common modular mounting components for supporting different variants of the top display 616. Such a common modular configuration with common modular mounting components has an advantage of allowing for top display 616 that may be securely mounted to the top box 690, and, in turn, to the cabinet 494 (of FIG. 4A), while still being removable from the top box 690, and replaced, without removing the gaming device 400 (of FIG. 4A) from the floor, by the same top display 616 or a different top display variant 1216 (of FIG. 12).

FIG. 6 also shows a switch 660 operable to detect, determine, or monitor if the housing assembly 650 has been removed or detached from the top box 690. In some embodiments, when the housing assembly 650 has been removed or detached from the top box 690, the switch 660 generates a signal and transmits the signal generated to the gaming device 400 (of FIG. 4A) or processor 204 (of FIG. 2A) to indicate that the housing assembly 650 has been removed or detached from the top box 690. When the housing assembly 650 has been removed or detached from the top box 690 as detected by the switch 660, the gaming device 400 locks up, stops, or terminates any software running game plays. In this way, game play may stop when the housing assembly 650 is removed or detached. As shown in FIG. 6, the switch 660 is a Cherry switch. Other switches, such as, for example, other linear switches, tactile switches, electrical switches, magnetic switches, mechanical switches, optical switches, push button switches, pressure switches, toggle switches, slide switches, float switches, plunger switches, and rotary switches may also be used. Although FIG. 6 shows only one switch, more switches may be used in this or other embodiments.

Figure 7:
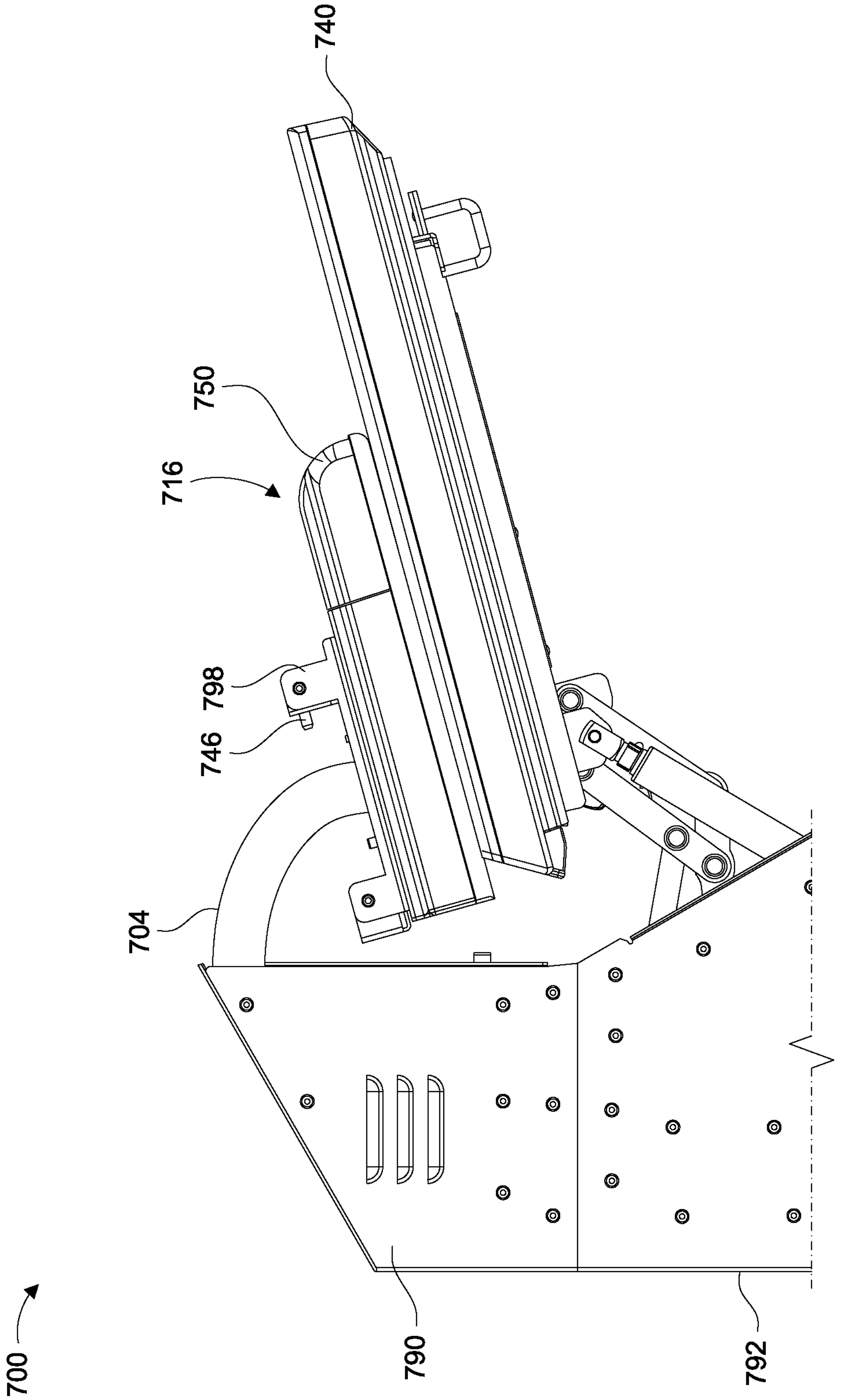
FIG. 7 illustrates a top display resting on the main display.

FIG. 7 illustrates an embodiment in which a housing assembly 750 (similar to the housing assembly 450 of FIG. 4A) rests on a main display 740 (similar to the main display 440 of FIG. 4A) after the housing assembly 750 has been removed from the top box 790. Allowing the top display 716 including a housing assembly 750, visual component such as the visual component 420 (of FIG. 4A), and audio component such as the audio component 424 (of FIG. 4A) to rest on the main display 740 may help a single field operator to remove and replace the top display 716 with little or no help from others. Alternatively, a strap (not shown) may connect the top box 790 to the top display 716 to temporarily suspend the top display 716 from the top box 790 while the field operator conducts removal or installation operations and/or potentially adjustments to the top display 716. Although not shown, the housing assembly 750 may include one or more grips or accesses for easy removal of the housing assembly 750 from the top box 790, without having to rest on the main display 740. In such configurations, a field operator may easily grab the housing assembly 750 at the grip or the access, and disengage any connection to the top box 790 to completely remove the housing assembly 750.

The housing assembly 750 may be connected to the top box 790 via an electrical quick connect, interface link, or link 704, which may also provide mechanical connection between the top box 790 and the housing assembly 750. In some embodiments, the link 904 may include electronic cables for controlling that top display 716 that includes the housing assembly 750 and the visual component 688 (of FIG. 6). The link 904 may also include power supply cables for powering the visual component 688 (of FIG. 6) and/or the housing assembly 750. In other embodiments, the link 704 may connect or pivotedly attach the top display 716 to the top box 790 with, such as, for example, mechanical pivot hinges or straps, providing the visual component 688 (of FIG. 6) with a predetermined degree of movements with respect to the top box 790. In such cases, for example, the link 704 may permit the housing assembly 750 to be suspended from the top box 790 during the removal and re-installation processes. Exemplary mechanical hinges may include, but are not limited to, butt hinges, ball bearing hinges, spring-loaded butt hinges, rising butt hinges, barrel hinges, pivot hinges, overlay hinges, offset hinges, strap hinges, hydraulic hinges, gas hinges, piston hinges, and the like. Exemplary mechanical straps may include, but are not limited to, Velcro® straps, ratchet straps, buckle straps, hanging straps, and the like. As shown in FIG. 7, the link 704 includes both a mechanical connection and an electrical connection.

In other embodiments, the link 704 may be a wireless interface. For example, the wireless interface may employee one or more Bluetooth and/or near-field transfer connections to provide or enable data, signals and/or power receptions and/or transmissions. In some examples, the wireless interface may be configured and embedded as part of a fastener (such as, for example, fasteners 698) in the top box 790, such that, when the housing assembly 750 is physically installed at the top box 790, Bluetooth and/or near-field transfer connections may be initiated. Conversely, when the housing assembly 750 is physically separated, detached, or removed from the top box 790, the data, signals and/or power receptions and/or transmissions may be terminated. That is, replacing or removal of the top display 716 from the top box 790 may be a single step process. Other wireless signal or power delivery connection may also be employed in the wireless interface. In some examples, the link 704 in the form of the wireless interface may also include a set of modular mounting components, for example, one or more magnets, for positioning the top display 716, which may also include a corresponding set of modular mounting components, for example, another set of magnets. After the link 704 has been disconnected or detached from top box 790, and the housing assembly 750 has been secured, the visual component 688 (of FIG. 6) may be replaced.

In other embodiments, after fasteners 640 (of FIG. 6) have been removed, and the housing assembly 650 has been detached from pin hole 568 (of FIG. 5B), the housing assembly 650 may be supported by the link 704. In this way, the housing assembly 650 may not need to rest on the main display to reduce or minimize damages or stress that may occur otherwise during movements. In such cases, the link 704 may also include cables for controlling electronics in the top display 716, or the housing assembly 650, and other hinges or straps, as discussed above. For example, in embodiments where pole brace brackets connect the top display 716 to the pedestal 792, the pole brace brackets may also function as a support for the top display 716.

Figure 8:
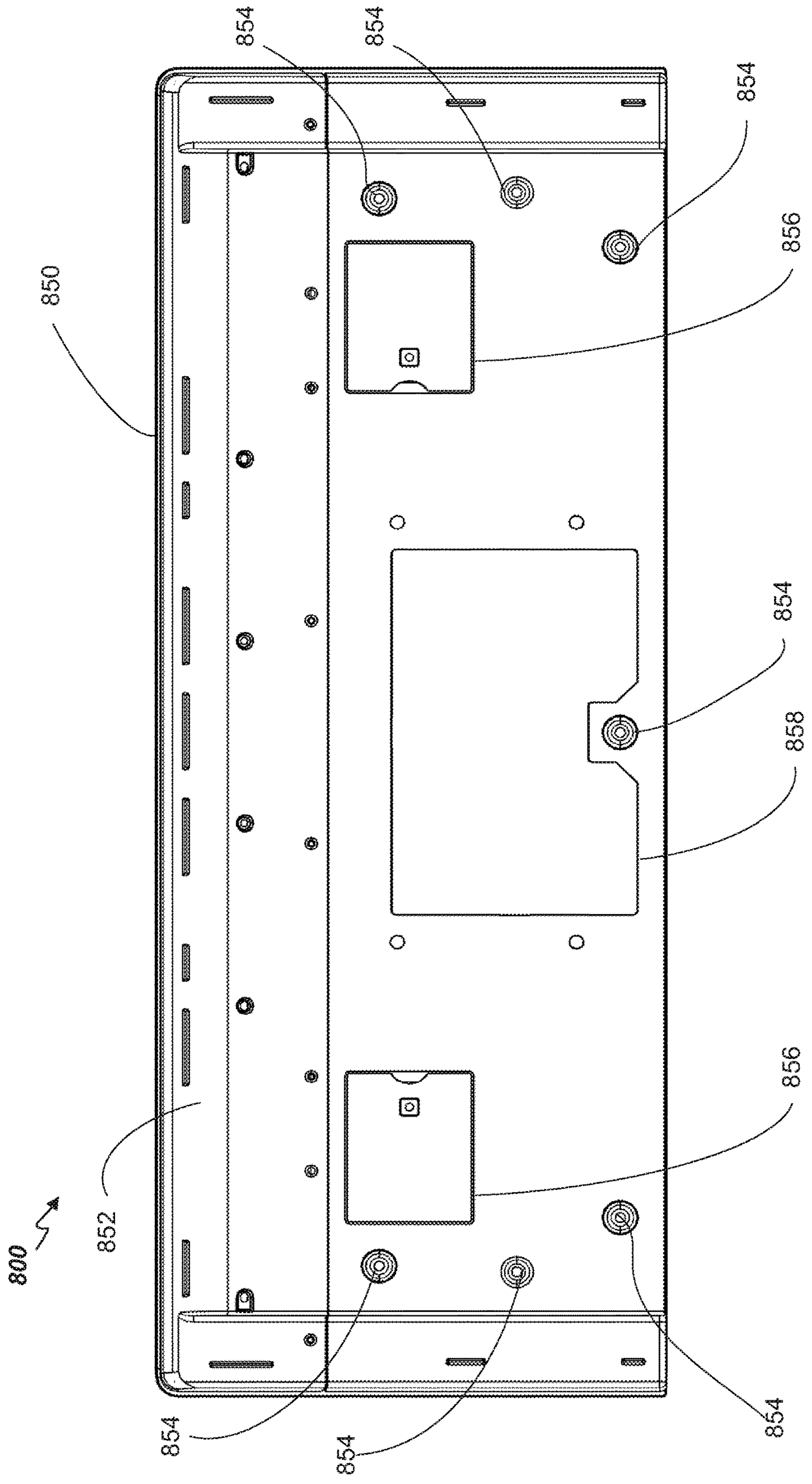
FIG. 8 illustrates a back view of a modular housing.

FIG. 8 illustrates a back view 800 of a housing assembly 850 (similar to the housing assembly 450 of FIG. 4A). In this example, the visual component 520 of FIG. 5B or the visual component 688 of FIG. 6 has been removed for clarity. The housing assembly 850 includes a rear housing assembly 852 and rear doors 856 providing access into the visual component 520 of FIG. 5B. The rear housing assembly 852 also includes a rear opening 858 through which interfaces or cables from the top box 790 (of FIG. 7) such as the link 704 or the gaming device 400 may interface with the visual component 520. The opening 858 may also provide an access to one or more control interfaces on the visual component 520. In some embodiments, the opening 858 may include a housing wireless interface operable to wirelessly receive data, signals and/or power from the wireless interface associated with the link 704. In such cases, the opening 858 may be positioned such that the housing wireless interface is positioned proximate to the wireless interface associated with the link 704. In other embodiments, the housing wireless interface may be positioned at other locations on the housing assembly 850, and, as such, the wireless interface associated with the link 704 may be correspondingly positioned in the visual component 520. FIG. 8 also shows a number of additional fastener receptacles or fastener locations 854 for receiving fasteners to secure the rear housing assembly 852. These additional fastener locations 854 are common and located similarly across different modular display variants 1116 and 1216, for example.

Figure 9A:
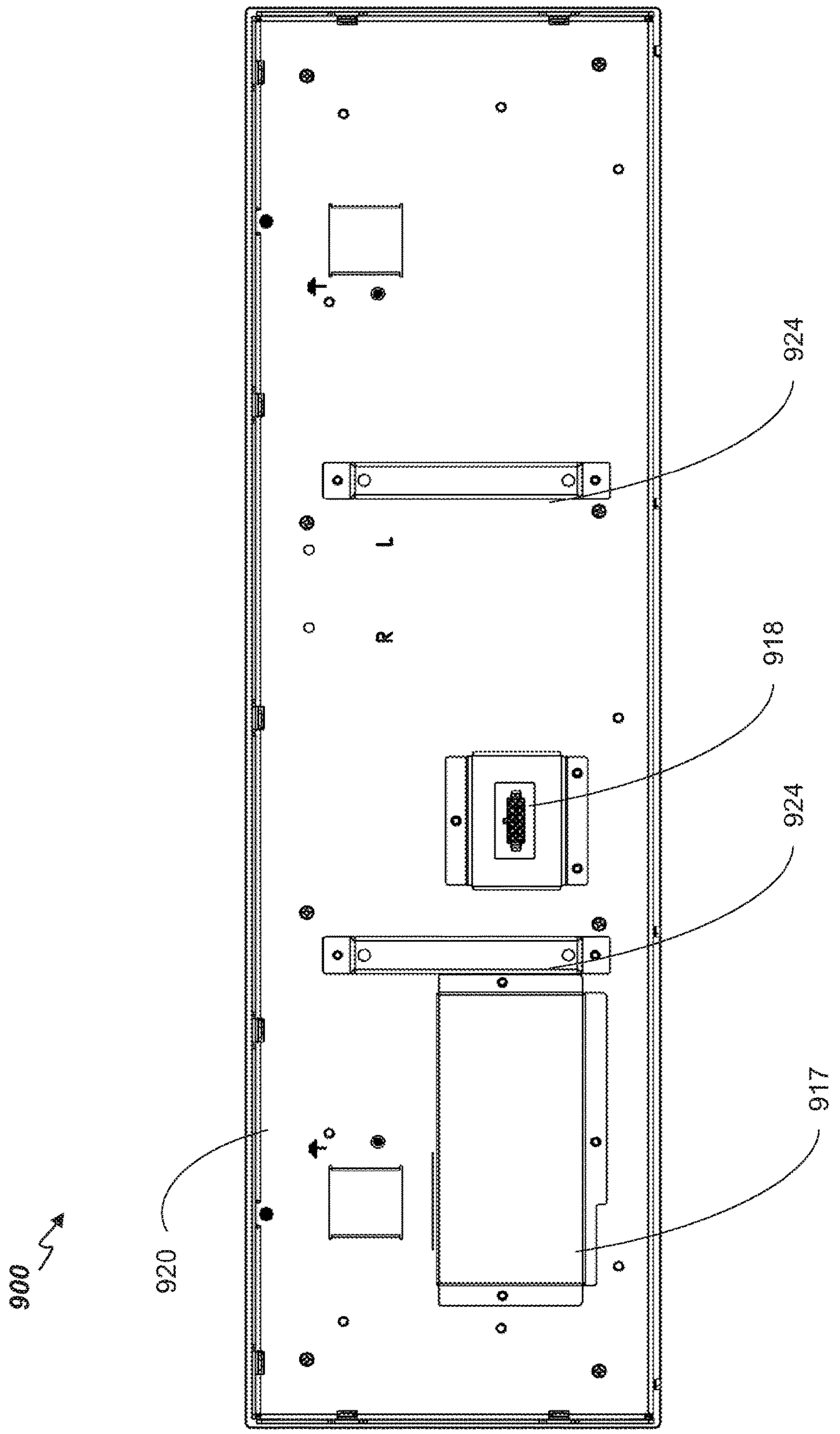
FIG. 9A illustrates a control panel of a first modular display variant.
Figure 9B:
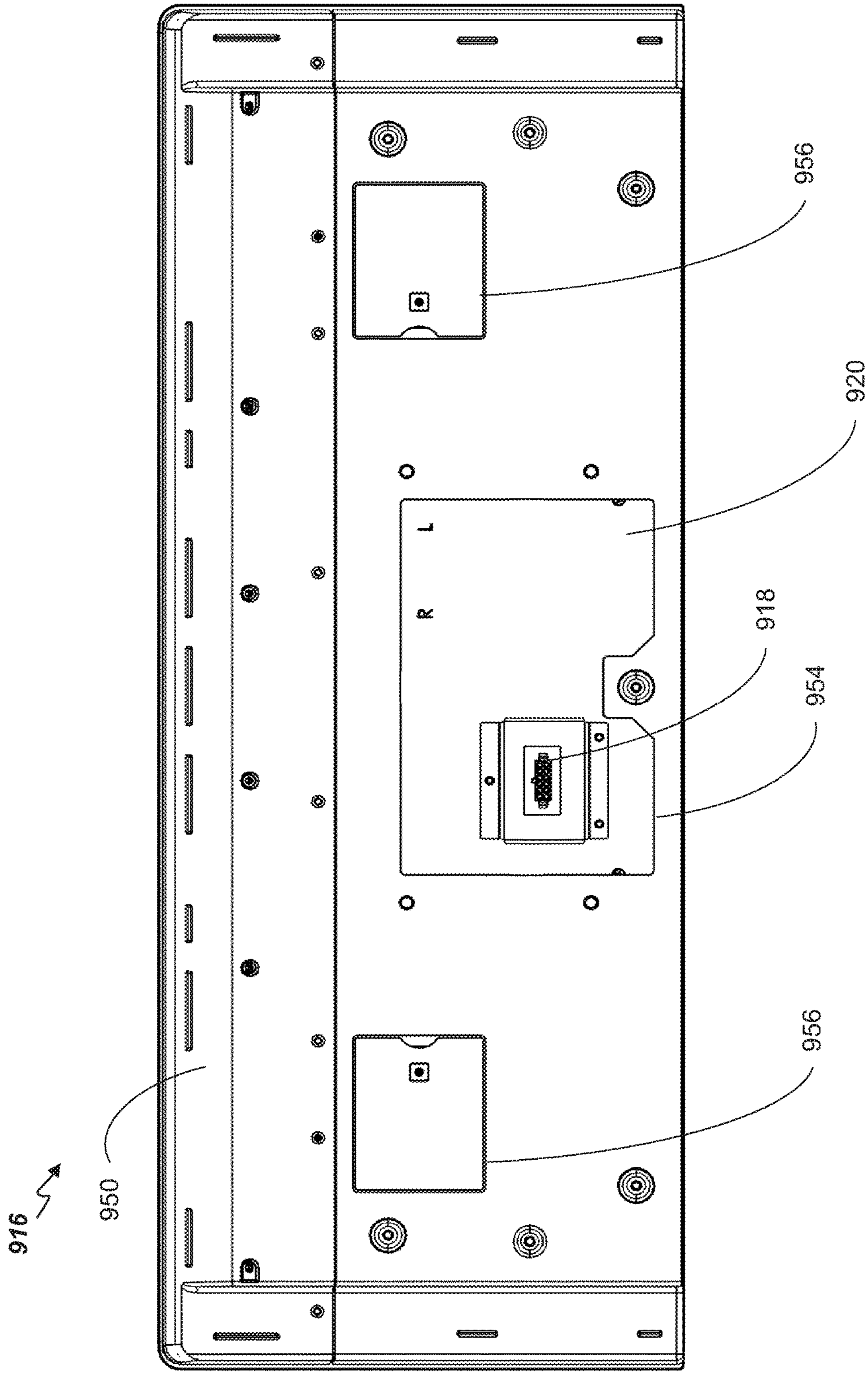
FIG. 9B illustrates a first modular housing with the first modular display variant 1104 of FIG. 9A.

FIG. 9A illustrates a control panel 900 of a visual component variant or a first modular display variant 920 to be installed in a housing assembly 950 of FIG. 9B. FIG. 9B also illustrates a first top display 916 after the first modular display variant 920 of FIG. 9A has been installed in the housing assembly 950 (similar to the housing assembly 850 of FIG. 8). In this embodiment, the first modular display variant 920 includes a receptacle connector 918 operable to receive control signals or power transmitted through one or more cables or the link 704 as shown in FIG. 7, for controlling or backlighting a static artwork module driven by a driver panel 917 via the opening 954. The receptacle connector 918 as shown includes a Molex 12-pin 43020-1200 Micro-Fit connector. Other exemplary receptacle connectors may include, but are not limited to, D-type connectors, serial port connectors, USB connectors, optical fiber receptacles, Ethernet receptacles, HDMI connectors, and the like. FIG. 9B also shows a pair of rear doors 956 for additional accesses to the first modular display variant 920. The first modular display variant 920 also includes mounting component 924 for receiving the rear housing assembly 952. In some embodiments, however, the receptacle connector 918 may optionally include a wireless interface (similar to the housing wireless interface) operable to wirelessly receive data, signals and/or power from the wireless interface associated with the link 704. In such cases, the receptacle connector 918 may be positioned, for example, near the driver panel 917, such that the wireless interface is positioned proximate to the wireless interface associated with the link 904 when the top display 916 is installed.

FIG. 9B also shows that a portion of the control panel 928 and specifically the receptacle connector 918 are accessible through the opening 954. Generally, the first modular display variant 920 includes a backlighting unit that backlights static artwork that is exteriorly protected by a glass assembly, detailed below. In some embodiments, the backlighting unit may include an LED backlighting panel or other backlighting devices such as fiber optic backlighting board, electroluminescent (EL) panel, cold cathode fluorescent lamps (CCFLs), and the like.

Figure 10A:
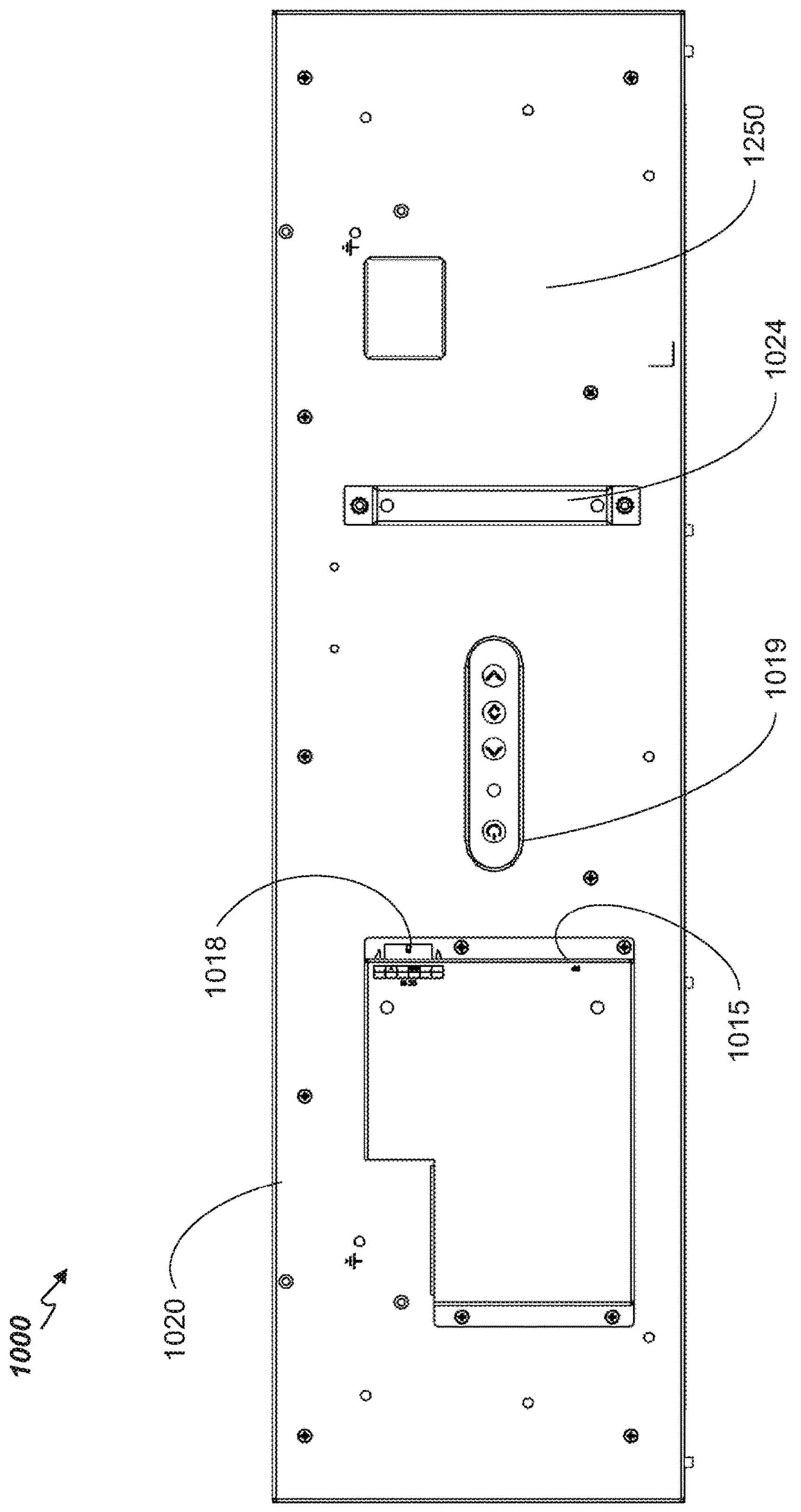
FIG. 10A illustrates a second control panel on a second modular display variant.
Figure 10B:
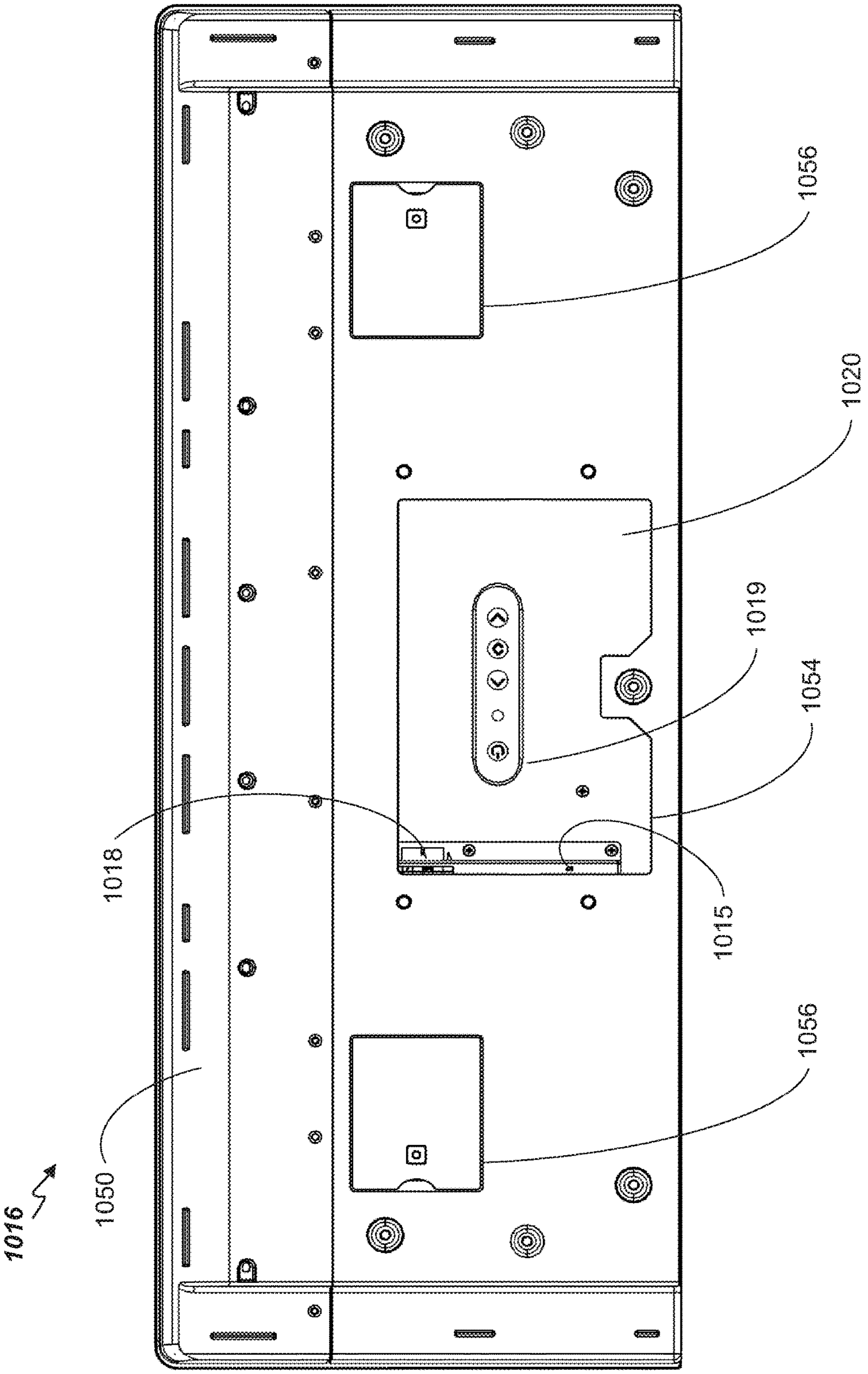
FIG. 10B illustrates a second modular housing with the second modular display variant of FIG. 10A.

FIG. 10A illustrates a second control panel 1000 of a visual component variant or a second modular display variant 1020 to be installed in a housing assembly 1050 of FIG. 10B. FIG. 10B also illustrates a second top display 1016 after the second modular display variant 1020 has been installed in the housing assembly 850 of FIG. 8, or the housing assembly 950 of FIG. 9A). In this embodiment, the second modular display variant 1020 includes an LCD module, a display port 1015, a second receptacle connector 1018 operable to receive one or more cables (not shown), for example, via as the link 704 as shown in FIG. 7, and a membrane interface 1019 for receiving manual inputs to control, interface, or operate the second modular display variant 1020, accessible through opening 1054. The display port 1015 may include a Panda AD DisplayPort or other display interface. Other display ports, such as, for example, a high-definition multimedia interface (HDMI), a digital visual interface (DVI), display port (DP), video graphics array (VGA) interface, universal serial bus type-C (USB-C) interface, Thunderbolt interface, serial digital interface (SDI), and the like, may also be used. Similar to the receptacle connector 918 of FIG. 9A, the second receptacle connector 1018 may also include a Molex 12-pin 43020-1200 Micro-Fit connector. As discussed previously, other exemplary receptacle connectors, such as, for example, D-type connectors, serial port connectors, and the like, may also be used. The second modular display variant 1020 also includes mounting bracket 1024 (similar to the mounting bracket 924 of FIG. 9A), as shown in FIG. 10A, for attaching the second modular display variant 1020 to the housing assembly 1050. FIG. 10B also shows a pair of rear doors 1056 for additional accesses to the second modular display variant 1020. In some embodiments, the second receptacle connector 1018 may optionally include a wireless interface (similar to the housing wireless interface) operable to wirelessly receive data, signals and/or power from the wireless interface associated with the link 704. In such cases, the second receptacle connector 1018 may be positioned, for example, near the display port 1015, such that the wireless interface is positioned proximate to the wireless interface associated with the link 704 when the top display 1016 is installed.

When the static artwork is to be updated, the static artwork is modularly replaced by a different static artwork, with minimum amount of changes needed to electronic gaming machine 104A-104X and without the need to move the electronic gaming machine 104A-104X from the casino floor. Similarly, since the housing assembly 950 (of FIG. 9B) and the housing assembly 1050 are common between the top box 916 and the top box 1016, any one variant of the top box 916 and the top box 1016 may modularly replace another one of the variants.

The flexible modularity via common mounts, common housing, replaceable artwork with backlighting, substitutable displays, and/or re-programmable software or firmware through the links advantageously provide casinos or gaming establishments with field or onsite top display 416 upgrade and/or replacement capability. For example, in some embodiments, when the first modular display variant 920 is to be replaced by the second modular display variant 1020, the first modular display variant 920 including the static artwork and the backlighting unit are removed from the housing assembly 950, and replaced with the second modular display variant 1020. In such cases, the link 704, wired or wirelessly, as shown in FIG. 7, for example, may also be replaced, and associated software or hardware may also be updated. In some embodiments, since the link 704 may include common connections for use with both the first modular display variant 920 and the second modular display variant 1020, the same link 704 may also be reused when the first modular display variant 920 is replaced by the second modular display variant 1020. The software originally installed on the electronic gaming machine 104 may be pre-configured to accommodate future changes to the housing assembly 1050 to further simplify or streamline the replacement process.

Further, since the second modular display variant 1020 is secured to the housing assembly 1050 with common brackets 1024, which is similar to brackets 924 of FIG. 9A, and the link 704 as shown in FIG. 9, a second main display similar to the main display 404 of FIG. 4 may be mounted to the top box 690 of FIG. 6, thereby doubling the amount of display dimensions. In yet another example, since the second modular display variant 1216 is connected to a common housing, for example, the top box 690 of FIG. 6, the second modular display variant 1216 is easily replaced with another modular display variant built for the top display housing 890 of FIG. 8, using the link 904 as shown in FIG. 9 or an upgraded version of the link 904, without major overhauling the entire gaming device.

FIG. 11 (including FIGS. 11A, 11B, 11C, and 11D) illustrates an example of a first sequence 1100 of static artwork removal with a first modular housing 1150 (similar to housing assembly 650 of FIG. 6, or housing assembly 850 of FIG. 8) having a first cover panel 1102. As shown in FIG. 11A, the first cover panel 1102 has a number of mounting or fastening locations, and may be removably attached to the first modular housing 1150 with fasteners in the form of screws 1107 at the fastening locations. After the screws 1107 have been removed, the first cover panel 1102 may be detached from the first modular housing 1150. FIG. 11A also shows brackets 1198 (similar to brackets 698 of FIG. 6) and fasteners 1146 (similar to second fasteners 546 of FIG. 5B)

Figure 11A:
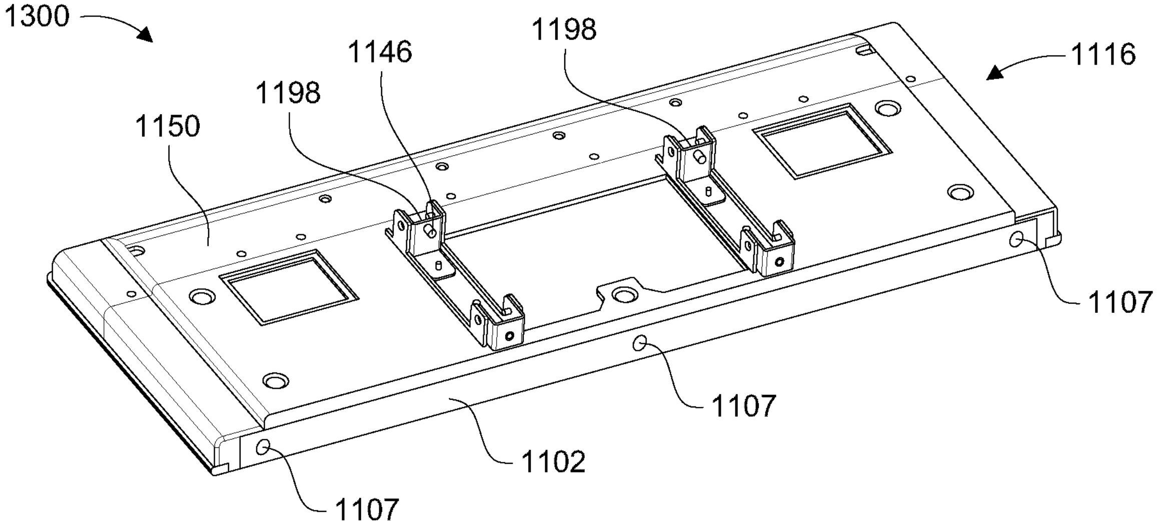
FIGS. 11A, 11B, 11C, and 11D illustrate a first sequence of static artwork removal.
Figure 11B:
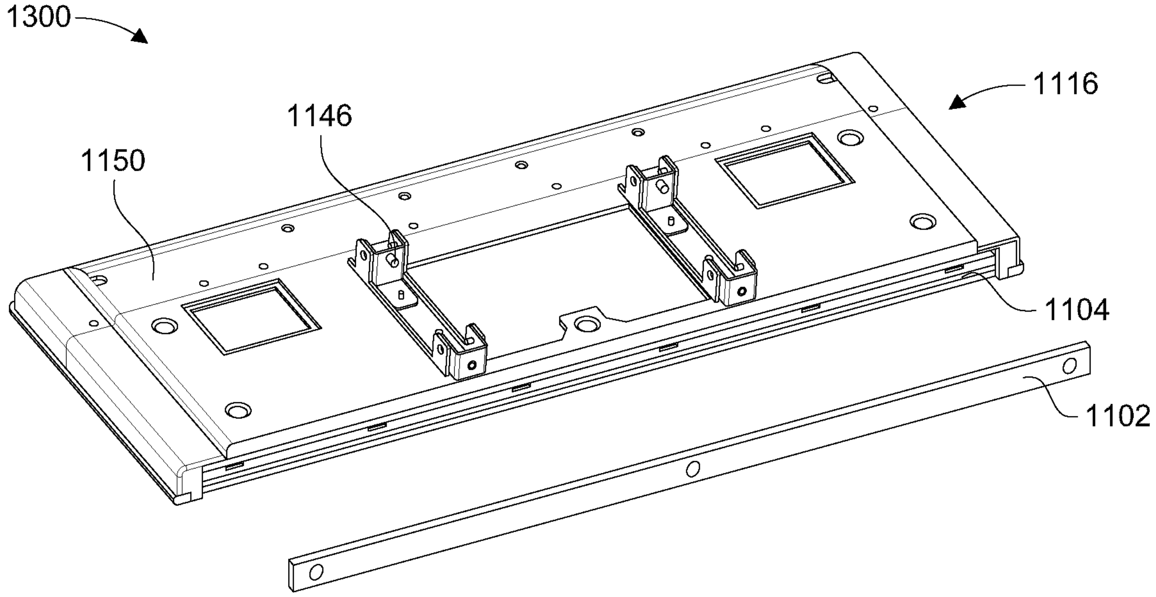
Figure 11C:
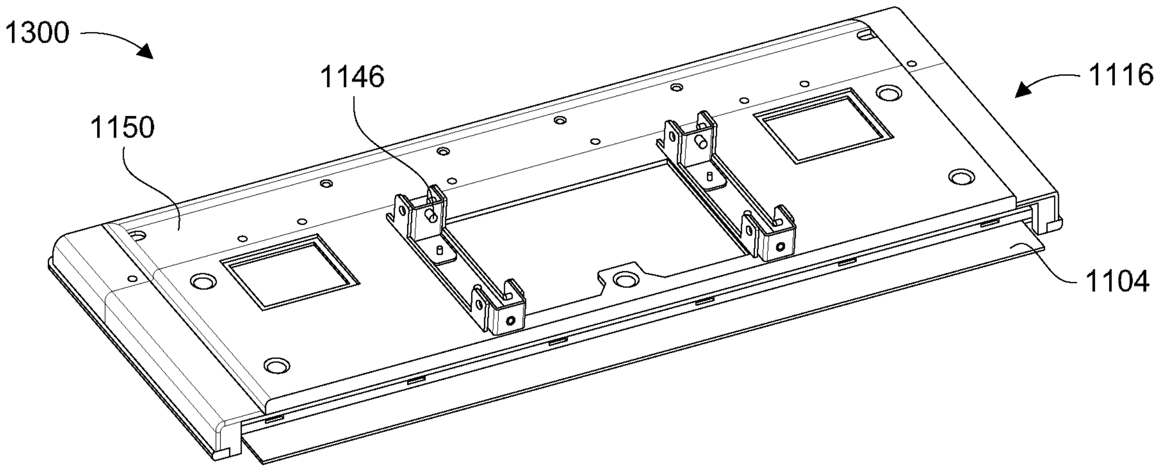
Figure 11D:
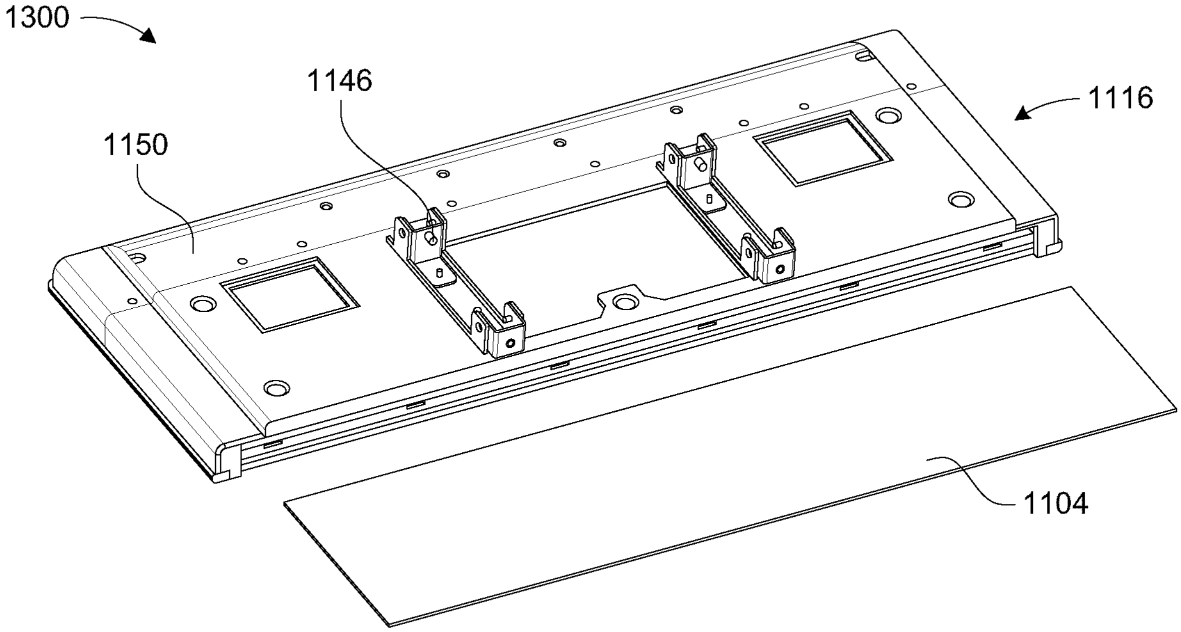

FIG. 11B shows that the first cover panel 1102 has been removed from the first modular housing 1150 to allow for access to static artwork 1104. FIG. 11C shows the static artwork 1104 has been partially pulled or removed from the first modular housing 1150, whereas FIG. 11D shows the static artwork 1104 has been completely removed from the first modular housing 1150. Subsequently, the static artwork 1104 can be replaced with a new static artwork by reversing the first sequence 1100 of static artwork removal.

Figure 12A:
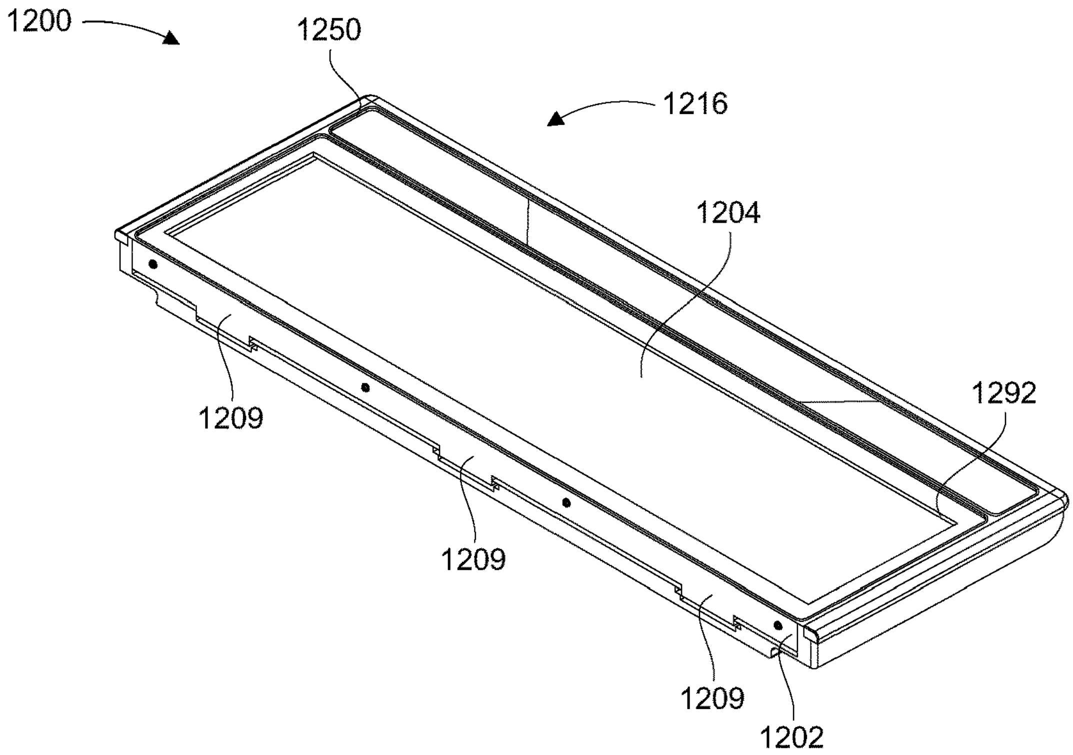
FIGS. 12A and 12B illustrate a second sequence of static artwork removal.
Figure 12B:
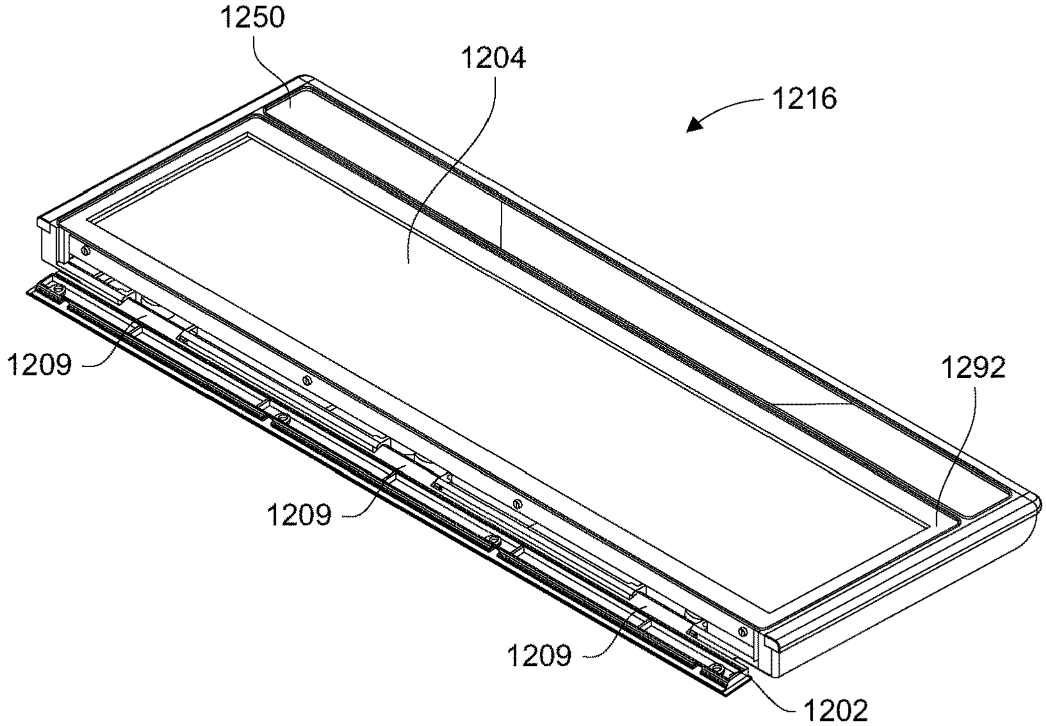

FIG. 12 (including FIGS. 12A and 12B) illustrates an example of a second sequence 1200 of static artwork removal with a first modular housing 1250 (similar to housing assembly 650 of FIG. 6, or housing assembly 850 of FIG. 8) having a second cover panel 1202. As shown, the second cover panel 1202 is attached to the first modular housing 1250 with hinges 1209. FIGS. 12A and 12B also show static artwork 1204 overlaid by a glass assembly 1292. The second cover panel 1202 is also secured to the first modular housing 1250 with screws, similar to the screws 1107 shown in FIG. 11. When the screws 1107 have been removed, the second cover panel 1204 may be swung away from the first modular housing 1250. When the second cover panel 1202 is swung opened, the static artwork 1204 is exposed and may be removed or replaced, similar to the first sequence 1100 of static artwork removal.

Figure 13:
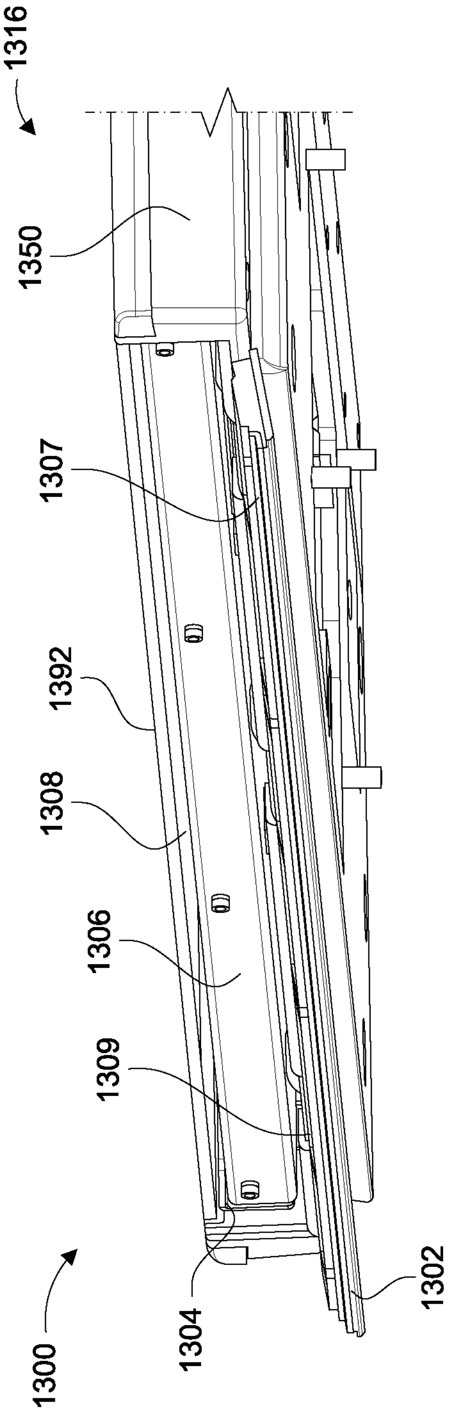
FIG. 13 illustrates a perspective bottom view of the first modular housing of FIG. 10B.

FIG. 13 illustrates a perspective bottom view 1300 of a first modular housing 1350 with the second cover panel 1302. As shown, the second cover panel 1302 is opened to allow access into the first modular housing 1350. When the second cover panel 1302 is open, details of the glass assembly 1392, the hinges 1309, static artwork slot 1304, and backlighting unit 1306 may be exposed. In the embodiment shown, the static artwork slot 1304 has a gap 1308 (e.g., about 3 mm) that separates the glass assembly 1592 and a backlighting unit 1306. As such, the static artwork 1204 (of FIG. 12) may slide in and out of the static artwork slot 1304.

Figure 14:
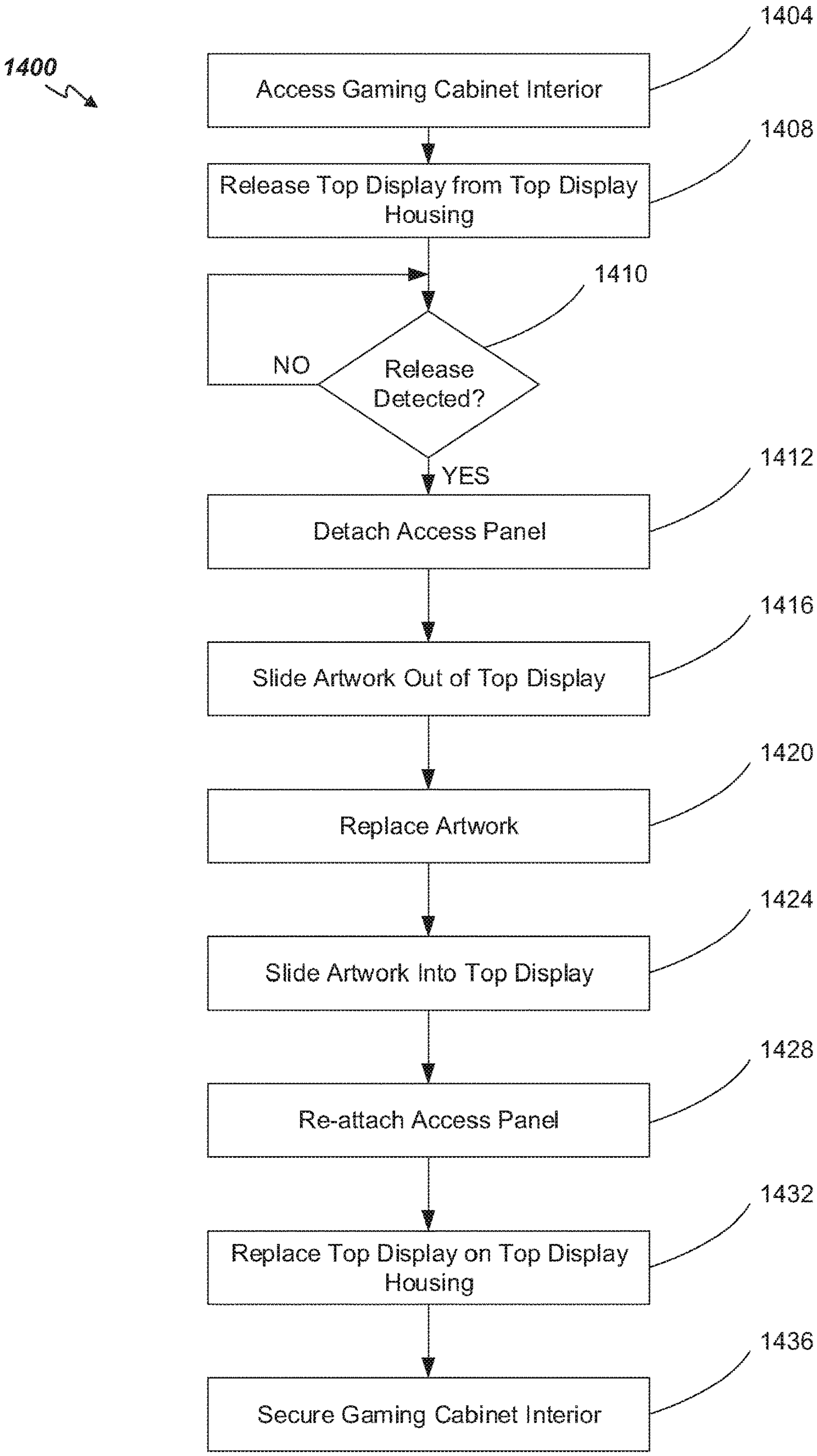
FIG. 14 illustrates a flowchart of a static artwork replacement sequence.

FIG. 14 illustrates an exemplary flowchart of a static artwork replacement sequence 1400. A similar sequence may be followed when the top display 416 is to be replaced with a new top display variant, e.g., that includes an LCD display.

When the static artwork or any top display on a gaming device (e.g., the gaming device 400 of FIG. 4A) is to be changed or replaced, a field operator gains access into interior 496 of the gaming cabinet 494 at block 1404, as discussed above with respect to FIGS. 4A, 4B, 4C, 4D, 5A, 5B, and 6-8. For example, when the main display 404 of FIG. 4A is opened, the interior 496 of the cabinet 494 is accessible.

In this example, at block 1408, when interior 496 of the cabinet 494 is accessible, the top display 416 may be detached from the top box 490 by removing the first fasteners 497 from the brackets 498, the second fastener 546 from the pin hole 568, and the link 704 from the top box 590, as discussed with respect to 4A, 4B, 4C, 4D, 5A, 5B, and 6-8. Also, as discussed above, while the top display 716 may rest on the main display 740 in some embodiments, the top display 716 may be detached from the top box 790 without being rested on the main display 740 in other embodiments. For example, the link 704 may act as a support for the top display 716 before the top display 716 is detached. Optionally, the static artwork replacement sequence 1400 may monitor at block 1410 to determine if the top display 716 has been detached or released as discussed with respect to FIG. 6. For example, when switch 660 has detected the top display 616 has been detached or released from the top box 690, the static artwork replacement sequence 1400 initiate stoppage or lock up of some or all of game play.

After the top display 716 is detached as determined at block 1410, a cover panel of the top display 716 (such as the first cover panel 1102 of FIG. 11) may be removed to allow or gain access to the interior of the top display 716.

At block 1412, the cover panel 1102, for example, may be detached or opened, as discussed with respect to FIGS. 11-13, by removing screws 1107. At block 1416, static artwork may slide out of the top display 1116. At block 1420, the static artwork 1104 may be replaced or adjusted.

To install a new static artwork back into the top display 1116, 1216, 1316, the new static artwork may slide into the static artwork slot 1304 (of FIG. 13), at block 1424. The access panel is subsequently re-attached at block 1428, as discussed with respect to FIGS. 11-13. For example, the first cover panel 1302 may be re-attached after the screws 1307 have been threaded back into the fastening locations. The top display 1316 may then be mounted back onto the top box 690 at block 1432, by re-attaching the link 704 from the top box 690 back to the top display 1316, re-inserting the second fastener 646 into the pin hole 568, and finally re-tightening the first fasteners 497 back to the brackets 498. At block 1436, the cabinet 494 is re-secured to prevent unauthorized access to the electronic gaming machine 104A-104X.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A modular gaming system comprising:

a gaming cabinet comprising a link housed by the gaming cabinet and a first mounting component;

a first display device pivotably mounted to the gaming cabinet;

a housing assembly being removably mounted to the gaming cabinet, the housing assembly comprising a modular mounting component; and a second display device comprising a second mounting component being releasably coupled to the first mounting component, the second display device being supported by the first display device when the second display device is detached from the first mounting component, and being operable with power and data transmitted through the link housed by the gaming cabinet, the second mounting component operable to releasably support different variants of the second display device, and the housing assembly, the first mounting component, and the second mounting component being common among different variants of the second display device.

2. The modular gaming system of claim 1, wherein the link is embedded in the first mounting component.

3. The modular gaming system of claim 1, wherein the link includes electronic cables for at least one of controlling and powering the second display device.

4. The modular gaming system of claim 1, further comprising a top box mounted on top of the gaming cabinet, and wherein the first mounting component extends from the top box to be connected to the second display device.

5. The modular gaming system of claim 1, wherein the modular gaming system is in an opened state when the first display device has been opened with respect to the gaming cabinet, wherein an interior of the gaming cabinet is accessible, and wherein the second display device becomes detachable in the opened state when the interior is accessible.

6. The modular gaming system of claim 1, wherein the first display device and the second display device form a unified display.

7. The modular gaming system of claim 1, wherein different variants of the second display device comprise at least one of a static artwork display and an LCD display.

8. An electronic gaming machine comprising:

a first display device pivotably mounted to a first housing;

a second housing being removably mounted adjacent the first housing, the second housing comprising a modular mounting component; and a second display device comprising a second mounting component being releasably coupled to the second housing at the modular mounting component and operable to receive power and data transmitted through the modular mounting component, the first display device operable to support the second display device when the second display device is detached from the modular mounting component, the second housing and the second mounting component operable to releasably support different variants of the second display device, and the second housing, the modular mounting component, and the second mounting component being common among different variants of the second display device.

9. The electronic gaming machine of claim 8, wherein the modular mounting component includes electronic cables for controlling the second display device, and power supply cables for powering the second display device.

10. The electronic gaming machine of claim 8, wherein the modular mounting component further includes at least one of brackets, bolts, pins, screws, adhesives, anchors, quick access fasteners, quick release pins, quarter-turn fasteners, and magnets.

11. The electronic gaming machine of claim 8, wherein the second display device is pivotably attached to the second housing.

12. The electronic gaming machine of claim 8, wherein the first display device and the second display device form a unified display.

13. The electronic gaming machine of claim 8, wherein the electronic gaming machine is in an opened state when the first display device has been opened with respect to the first housing, wherein an interior of the first housing is accessible, and wherein the second display device becomes detachable in the opened state when the interior is accessible.

14. The electronic gaming machine of claim 8, wherein the second display device includes at least one of a static artwork display and an LCD display.

15. A method of configuring a gaming machine comprising a first display device pivotably mounted to a first housing, a second housing having a modular mounting component, a second display device having a second mounting component, the second mounting component being operable to releasably support different variants of the second display device, and the second housing, the modular mounting component, and the second mounting component being common among different variants of the second display device, the method comprising:

mounting the second housing adjacent the first housing;

releasably mounting the second mounting component of the second display device on the modular mounting component;

receiving power and data at the second display device transmitted through the modular mounting component; and replacing the second display device with a second display device variant, the first display device operable to support the second display device when the second display device is detached from the modular mounting component.

16. The method of claim 15, wherein the modular mounting component includes electronic cables for controlling the second display device, and power supply cables for powering the second display device, and at least one of brackets, bolts, pins, screws, adhesives, anchors, quick access fasteners, quick release pins, quarter-turn fasteners, and magnets.

17. The method of claim 15, wherein the second display device is pivotably attached to the second housing.

18. The method of claim 15, further comprising forming a unified display from the first display device and the second display device.

19. The method of claim 15, wherein the gaming machine is in an opened state when the first display device has been opened with respect to the first housing, wherein an interior of the first housing is accessible, and wherein the second display device becomes detachable in the opened state when the interior is accessible.

20. The method of claim 15, wherein the second display device includes at least one of a static artwork and an LCD display.

* * * * *